(12) United States Patent
Hayamizu

(10) Patent No.: US 12,392,314 B2
(45) Date of Patent: Aug. 19, 2025

(54) POWER GENERATION SYSTEM

(71) Applicants: Global Energy Harvest Co., Mitaka (JP); Kohei Hayamizu, Mitaka (JP); Hayamizu Urban Environmental Development Corporation, Mitaka (JP); Hayamizu Energy Harvesting Project Corporation, Mitaka (JP)

(72) Inventor: Kohei Hayamizu, Mitaka (JP)

( * ) Notice: Subject to any disclaimer, the term of this patent is extended or adjusted under 35 U.S.C. 154(b) by 0 days.

(21) Appl. No.: 18/640,173

(22) Filed: Apr. 19, 2024

(65) Prior Publication Data

US 2024/0263607 A1    Aug. 8, 2024

Related U.S. Application Data

(63) Continuation-in-part of application No. PCT/JP2021/038539, filed on Oct. 19, 2021.

(51) Int. Cl.
*F03B 13/16* (2006.01)
*F03B 13/22* (2006.01)

(52) U.S. Cl.
CPC .............. *F03B 13/16* (2013.01); *F03B 13/22* (2013.01); *F05B 2220/706* (2013.01); *F05B 2240/93* (2013.01)

(58) Field of Classification Search
CPC .... F03B 13/16; F03B 13/22; F05B 2220/706; F05B 2240/93
See application file for complete search history.

(56) References Cited

U.S. PATENT DOCUMENTS

| | | | |
|---|---|---|---|
| 4,622,812 | A | 11/1986 | Thompson, Jr. et al. |
| 5,176,552 | A | 1/1993 | Kuboyama et al. |
| 2005/0169104 | A1 | 8/2005 | Szegedi et al. |
| 2010/0132353 | A1 | 6/2010 | Kelly |

(Continued)

FOREIGN PATENT DOCUMENTS

| | | |
|---|---|---|
| EP | 2789848 A1 | 10/2014 |
| JP | 57-044776 A | 3/1982 |

(Continued)

OTHER PUBLICATIONS

CD-ROM of the specification and drawings annexed to the request of Japanese Utility Model Application No. 81858/1991 (Laid-open No. 27285/1993) (Shikanaigumi Inc.) Apr. 9, 1993.

(Continued)

*Primary Examiner* — Viet P Nguyen
(74) *Attorney, Agent, or Firm* — Brian J. Colandreo; Jeffrey T. Placker; Holland & Knight LLP

(57) ABSTRACT

There is provided a power generation device that generates electricity using a potential energy of a fluid raised to a predetermined height position by a wave force, the device including: a housing (1) that floats, the housing (1) including a front side opening portion (16) for taking a wave into an inside of the housing (1) on a front side of the housing (1); a float accommodated in the housing (1); a feeding device that feeds the circulation fluid toward the predetermined height position based on a wave force received by the float due to the wave taken into the inside of the housing (1) through the front side opening portion (16); a power generation unit that generates the electricity; and a suppressing member that suppresses a swing of the housing (1).

15 Claims, 29 Drawing Sheets

(56) References Cited

U.S. PATENT DOCUMENTS

| | | | |
|---|---|---|---|
| 2012/0013126 A1* | 1/2012 | Molloy | F03B 13/20 290/53 |
| 2012/0261923 A1 | 10/2012 | Hassavari | |
| 2013/0081388 A1 | 4/2013 | Straume et al. | |
| 2017/0234291 A1 | 8/2017 | Noia | |
| 2022/0082075 A1* | 3/2022 | Onda | F03B 13/22 |

FOREIGN PATENT DOCUMENTS

| | | | | |
|---|---|---|---|---|
| JP | 62-502764 A | 10/1987 | | |
| JP | 64-019076 U | 1/1989 | | |
| JP | 02-252976 A | 10/1990 | | |
| JP | 03-023384 A | 1/1991 | | |
| JP | 04-058794 U | 5/1992 | | |
| JP | 04-209972 A | 7/1992 | | |
| JP | 05-027285 U | 4/1993 | | |
| JP | 11-223174 A | 8/1999 | | |
| JP | 2000-104653 A | 4/2000 | | |
| JP | 2003-166461 A | 6/2003 | | |
| JP | 2007-519859 A | 7/2007 | | |
| JP | 2009-511783 A | 3/2009 | | |
| JP | 03-153338 U | 9/2009 | | |
| JP | 2013-512389 A | 4/2013 | | |
| JP | 2013-515903 A | 5/2013 | | |
| JP | 2013-155610 A | 8/2013 | | |
| JP | 2015-014230 A | 1/2015 | | |
| JP | 2017-141799 A | 8/2017 | | |
| JP | 2017-145751 A | 8/2017 | | |
| JP | 2018-066367 A | 4/2018 | | |
| WO | 2013/084633 A1 | 6/2013 | | |
| WO | WO-2014089983 A1 * | 6/2014 | | F03B 13/20 |
| WO | WO-2020170194 A1 * | 8/2020 | | F03B 13/22 |

OTHER PUBLICATIONS

International Search Report and Written Opinion issued in related Application Serial No. PCT/JP2021/038539, issued on Dec. 28, 2021.

* cited by examiner

[Fig.1]
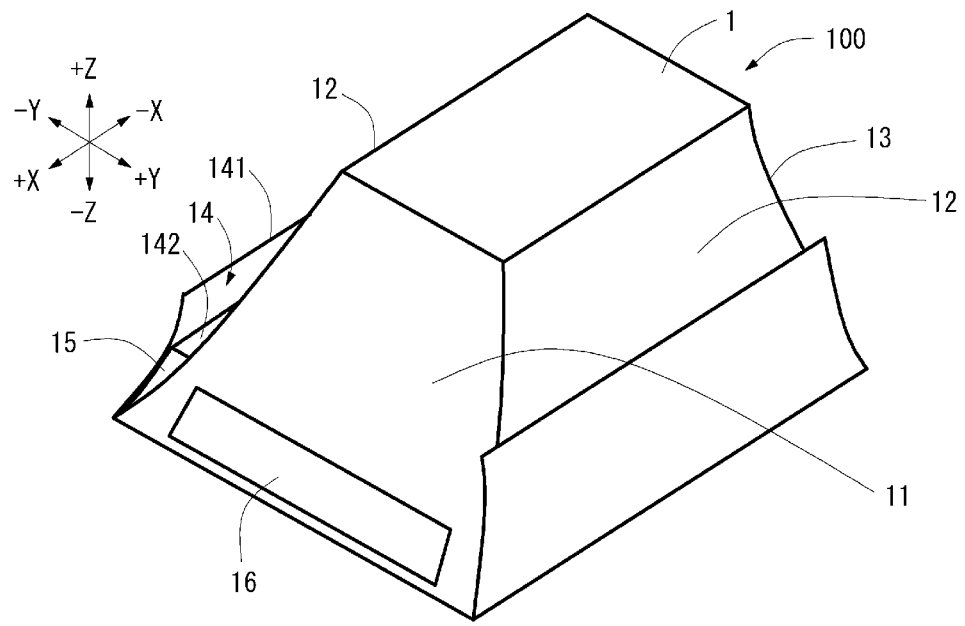
[Fig.2]
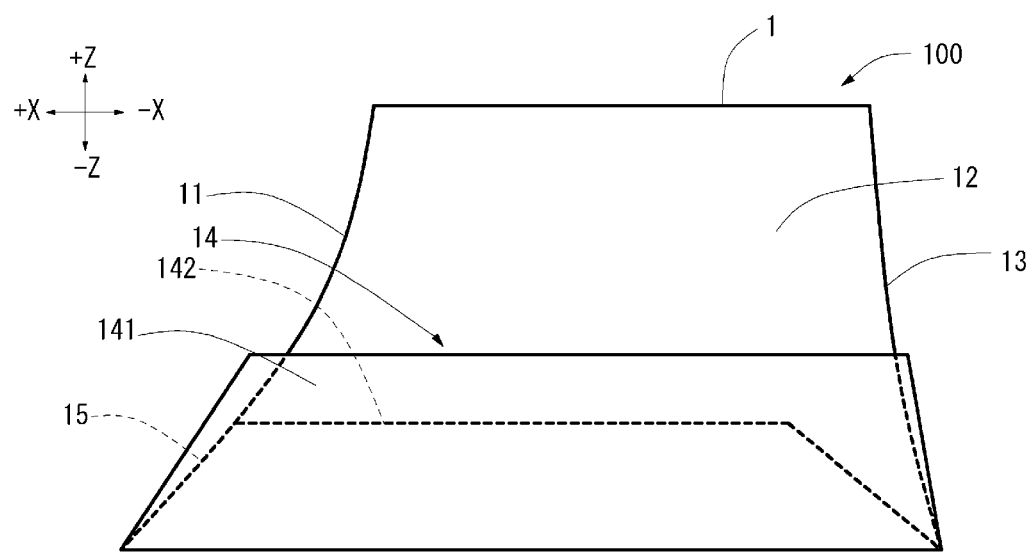

[Fig.3]
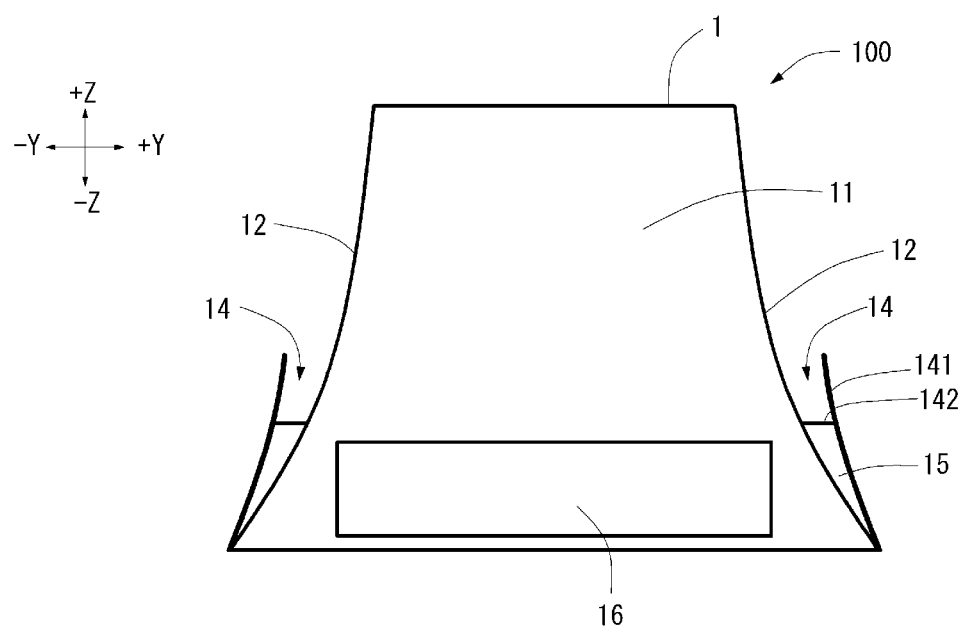
[Fig.4]
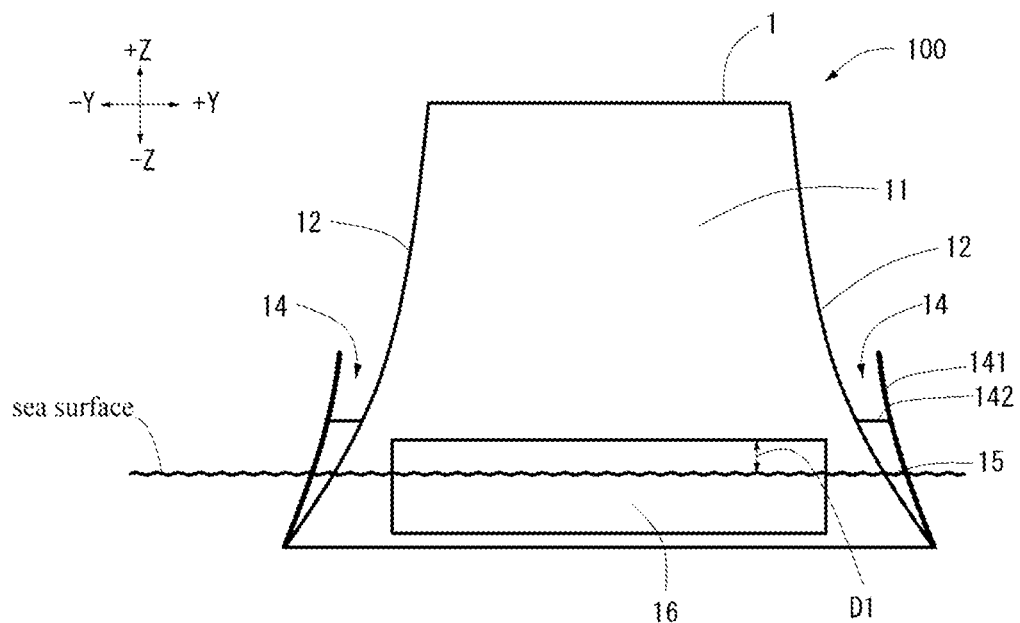

[Fig.5]
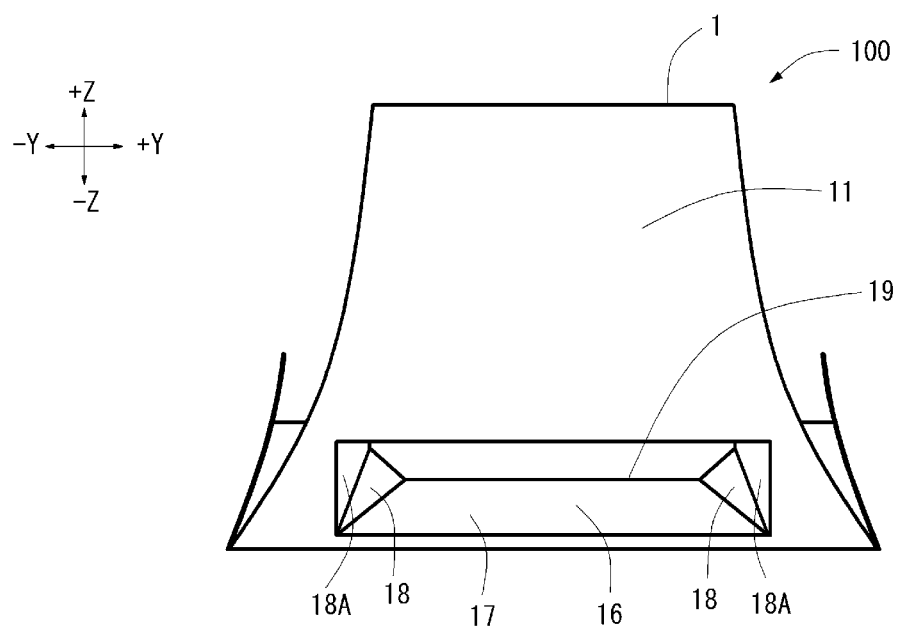
[Fig.6]
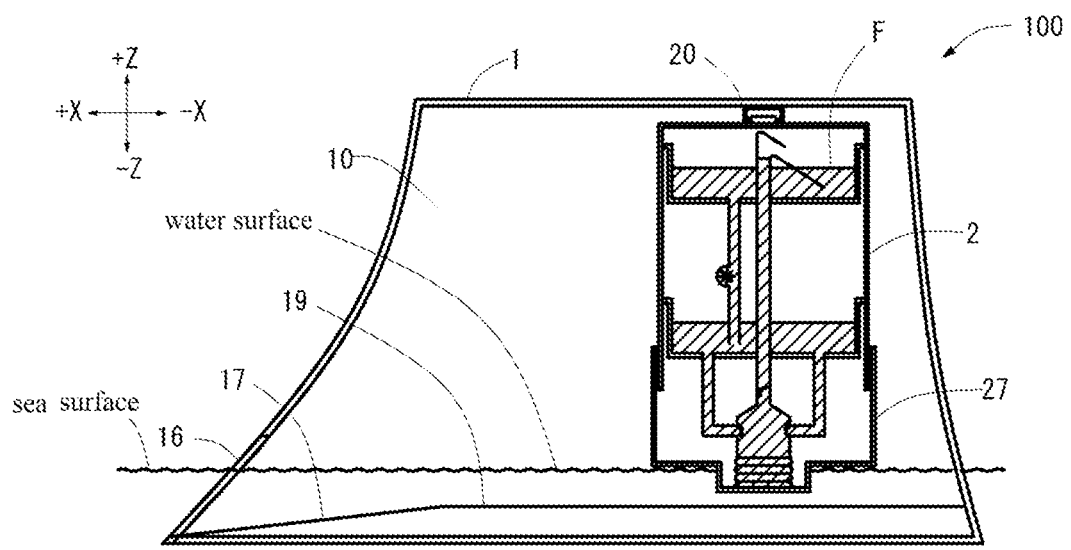

[Fig.7]
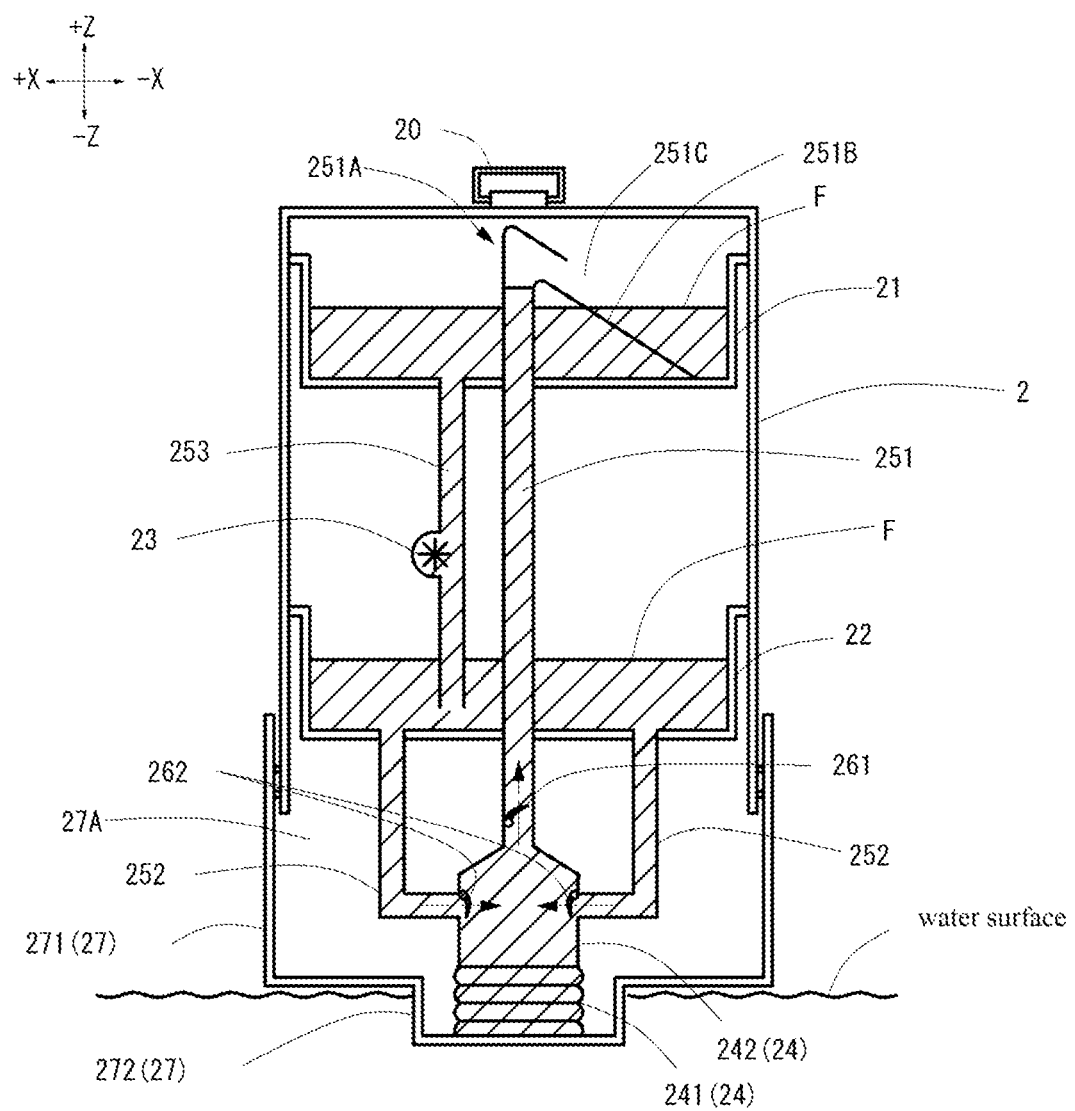

[Fig.8]
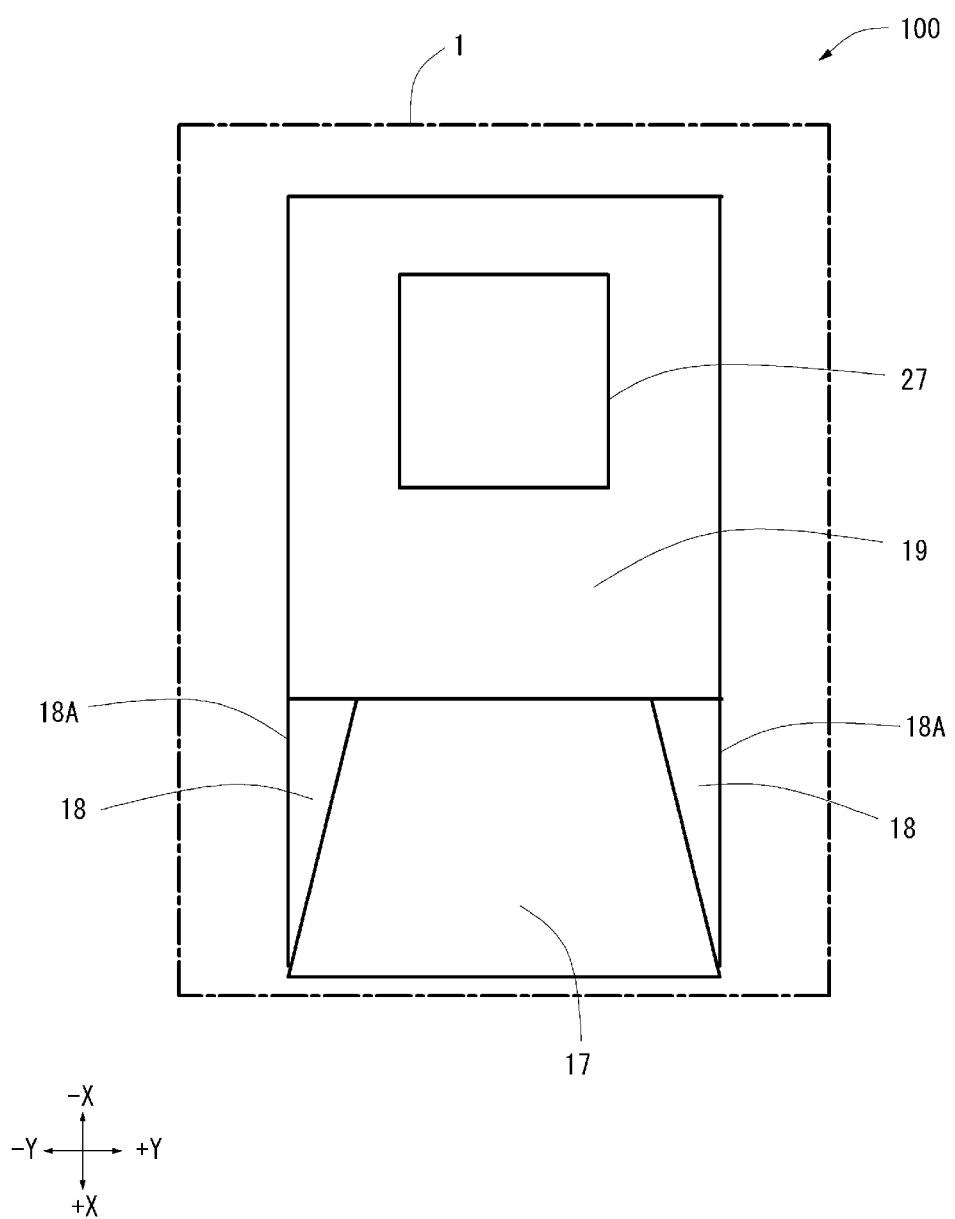

[Fig.9]
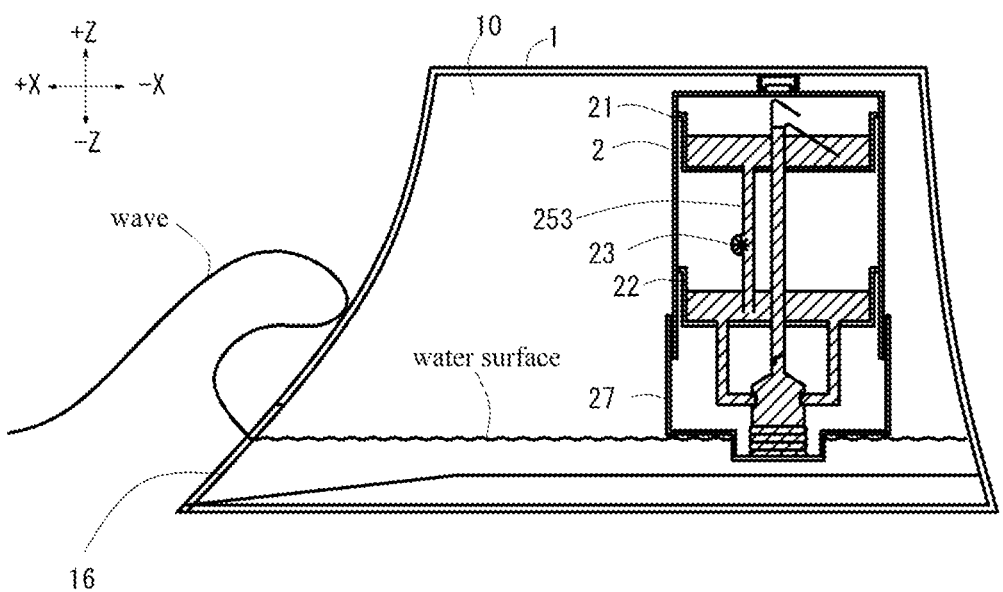
[Fig.10]
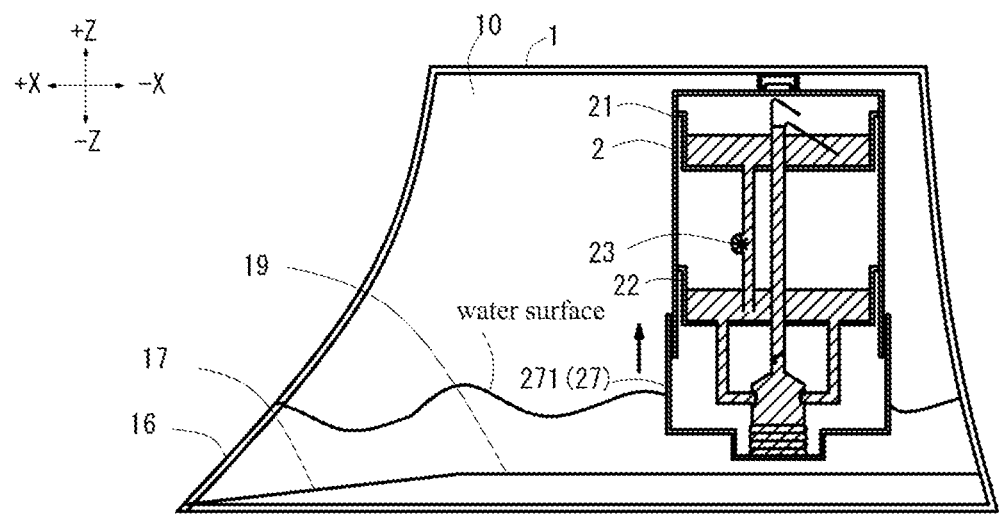

[Fig.11]
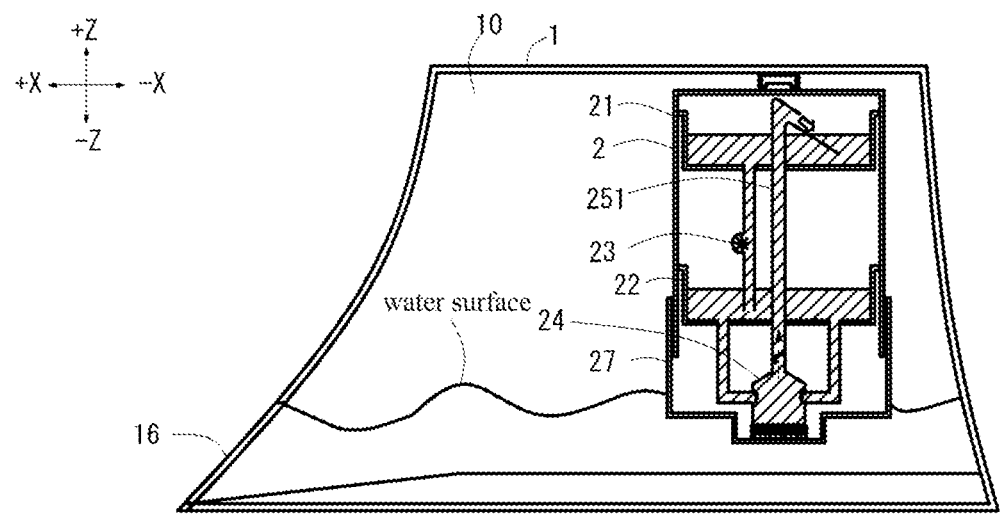
[Fig.12]
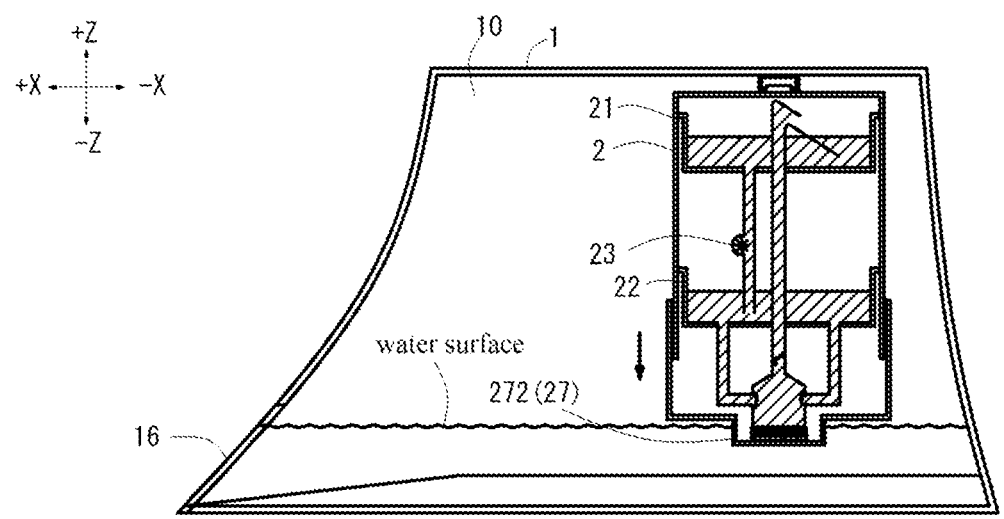

[Fig.13]
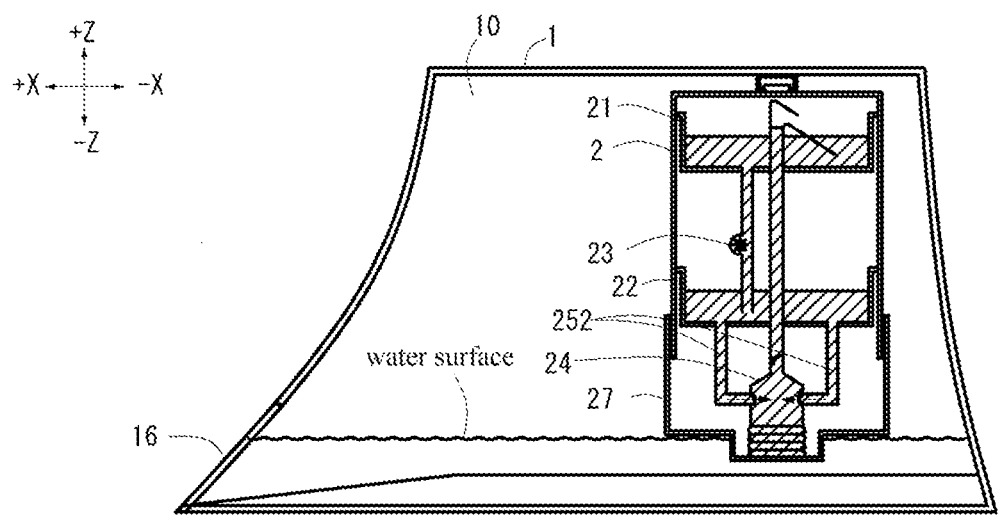
[Fig.14]
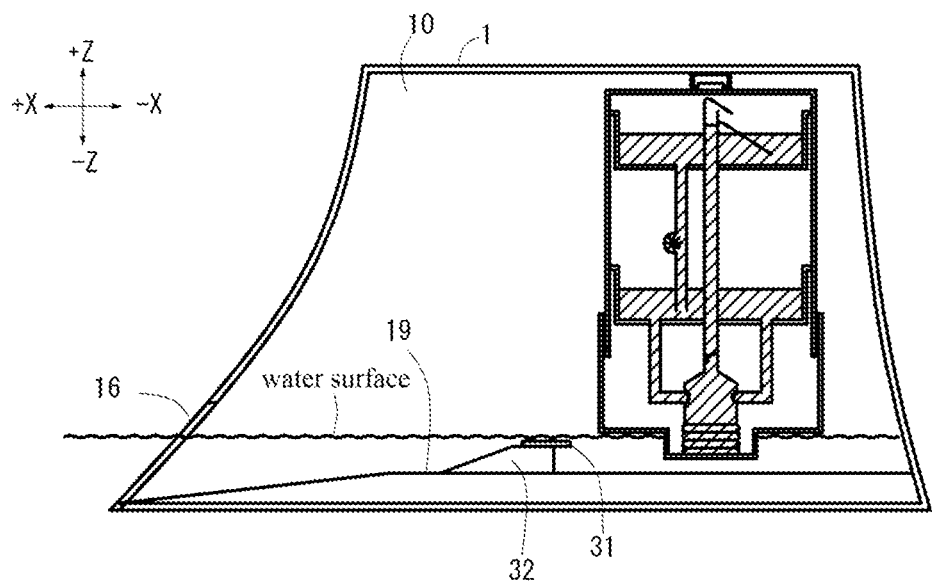

[Fig.15]
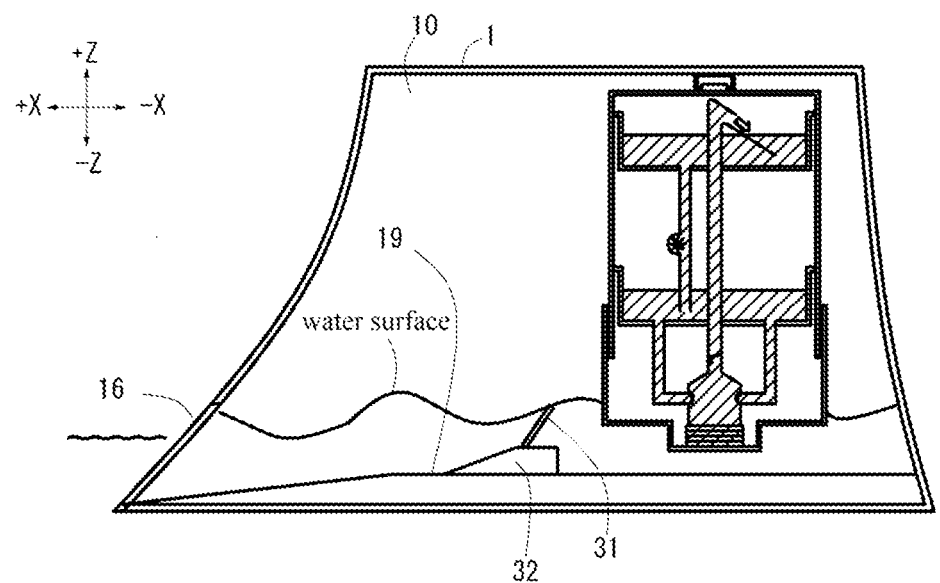
[Fig.16]
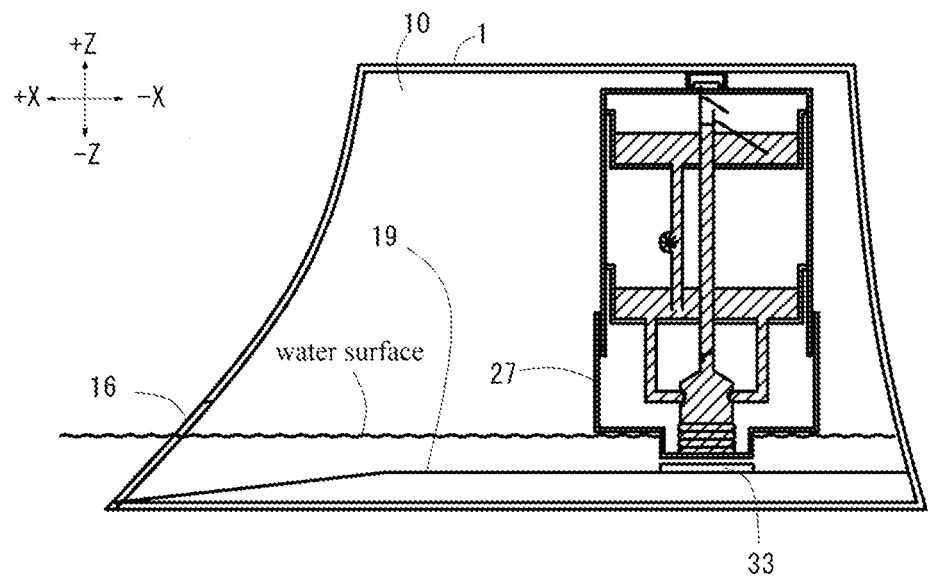

[Fig.17]
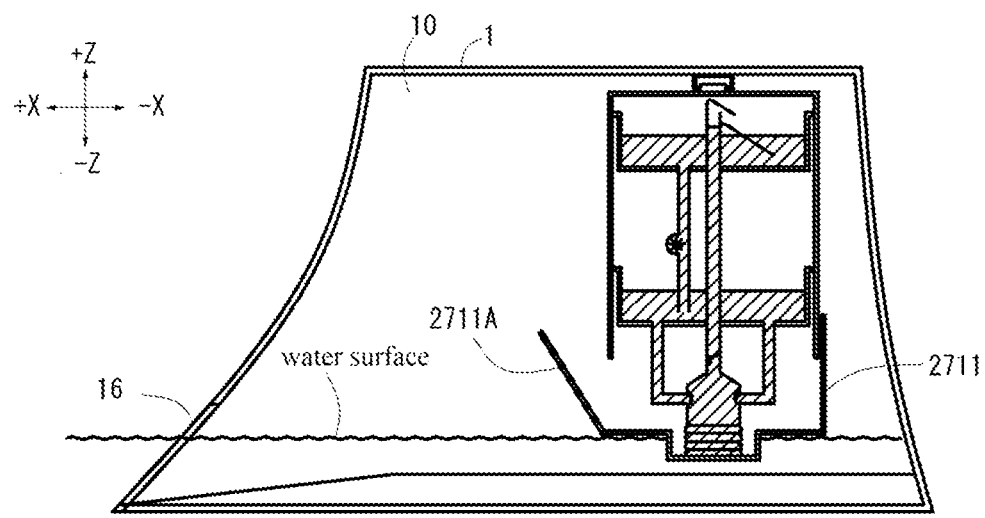
[Fig.18]
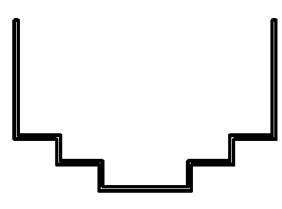
(a)
(b)
(c)
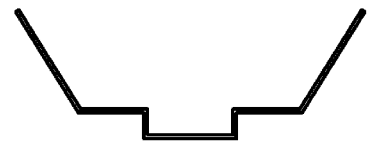
(d)

[Fig.19]
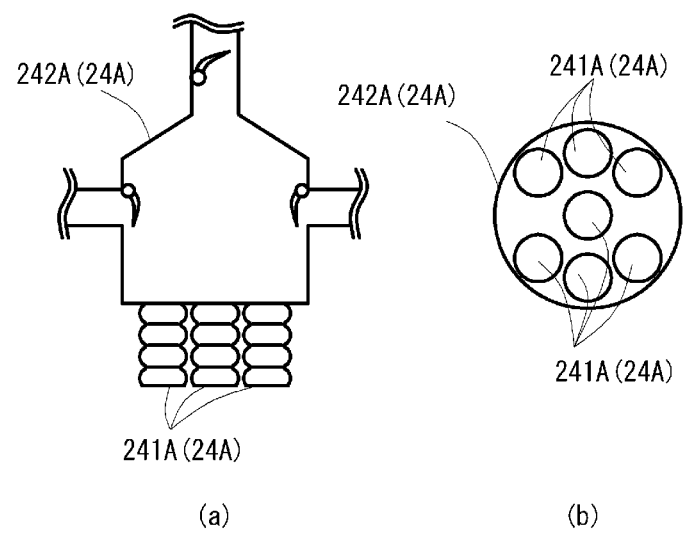
(a)  (b)

[Fig.20]
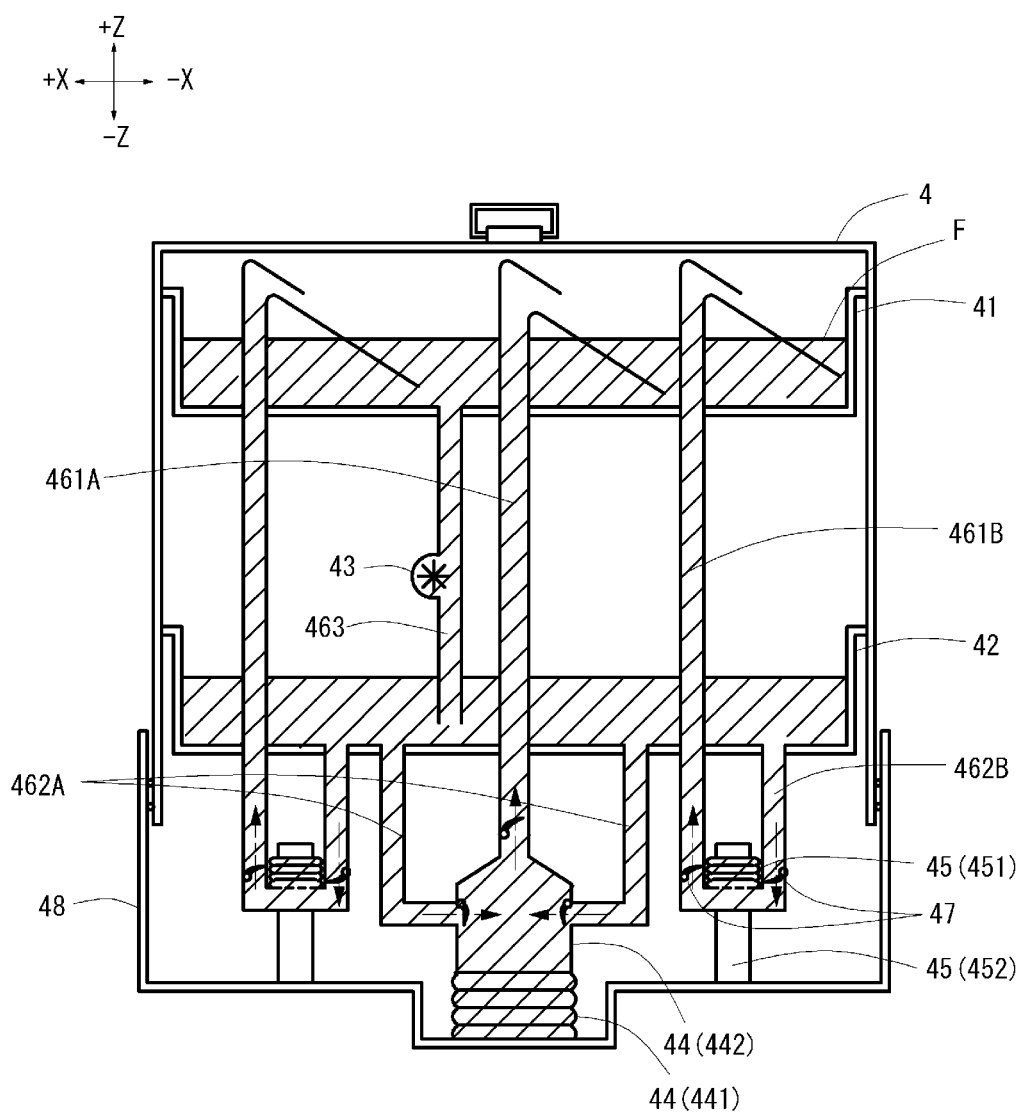

[Fig.21]
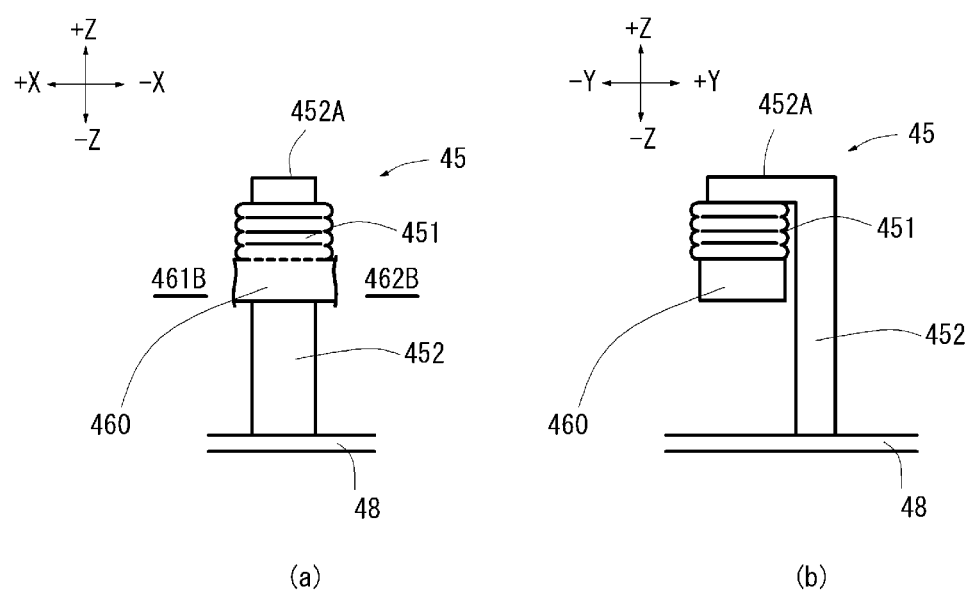
(a)  (b)

[Fig.22]
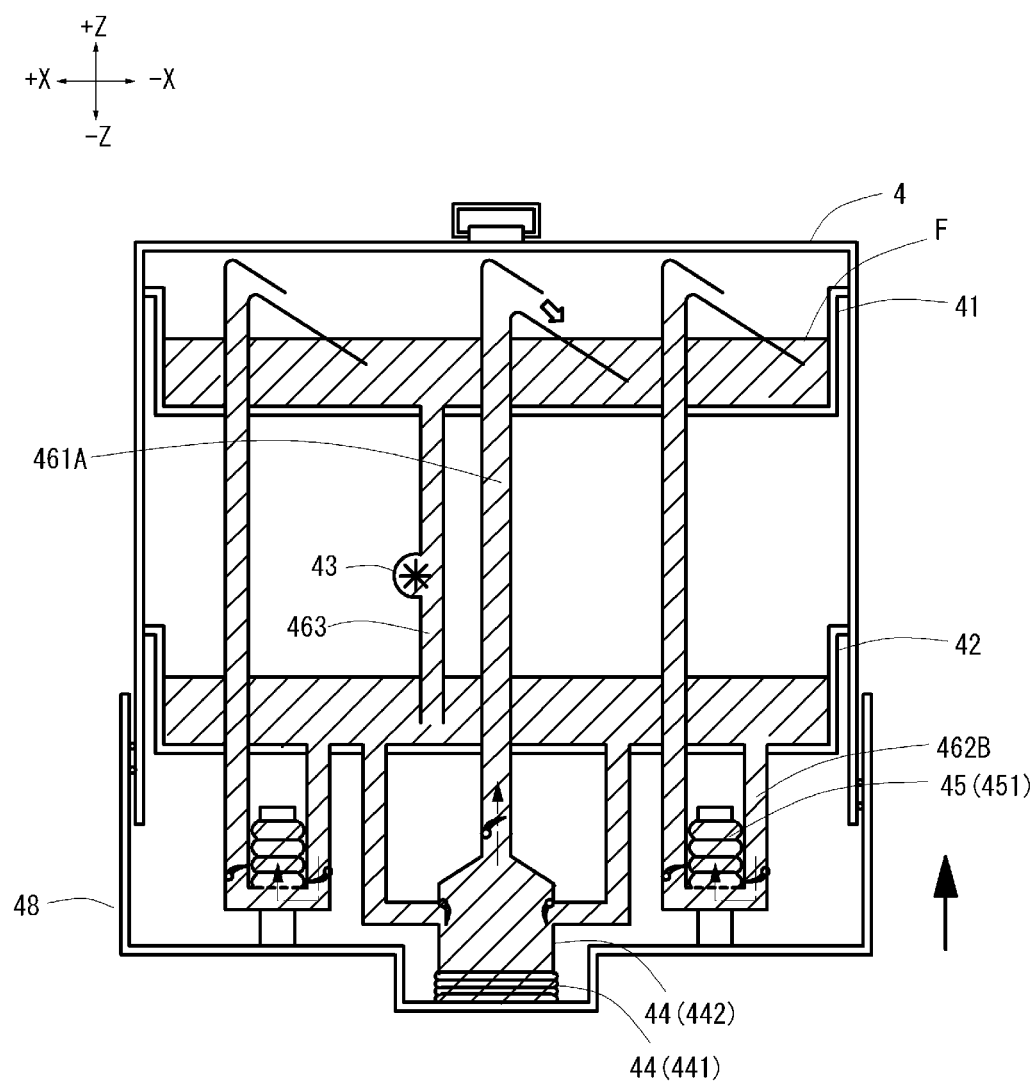

[Fig.23]
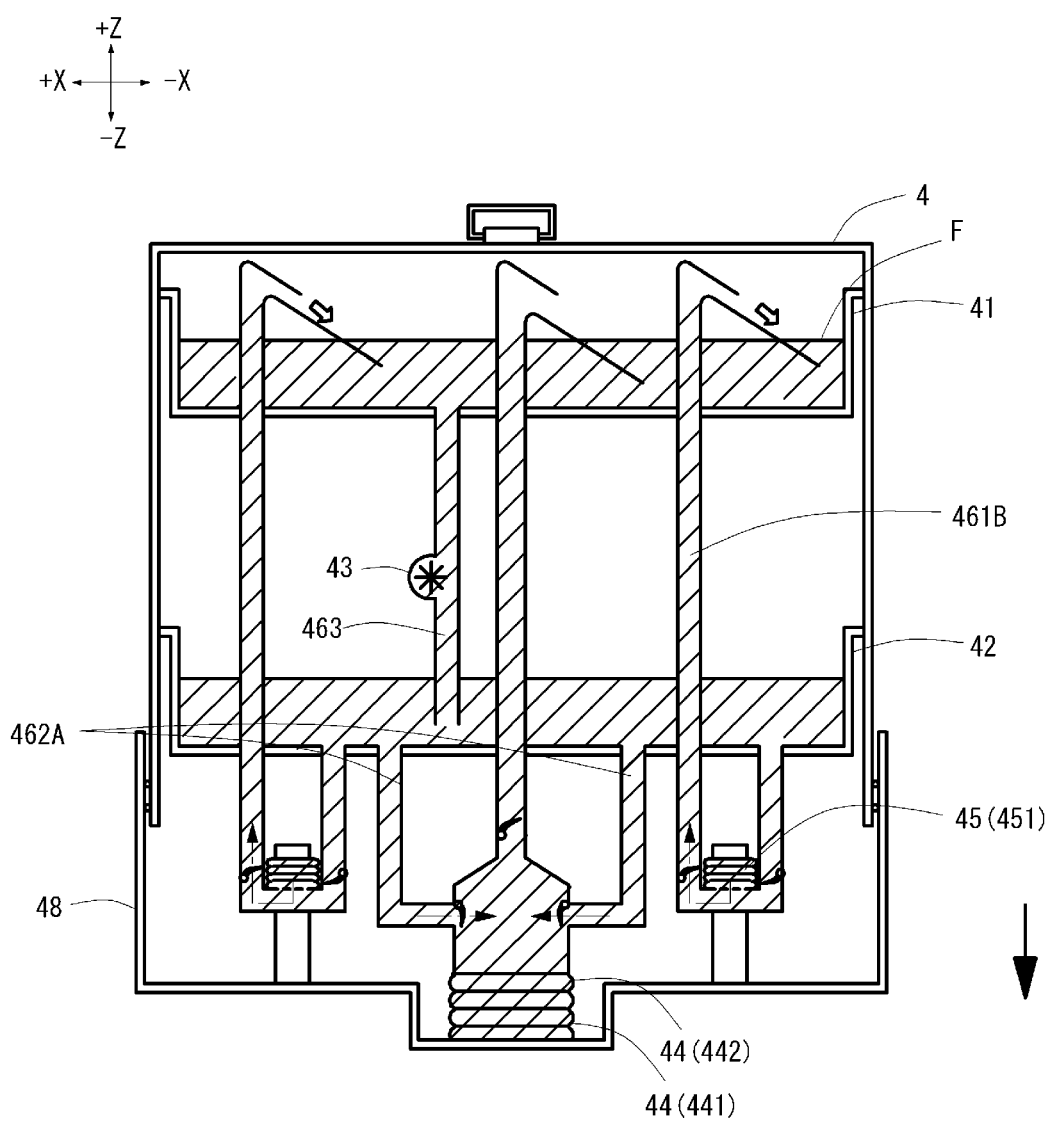

[Fig.24]
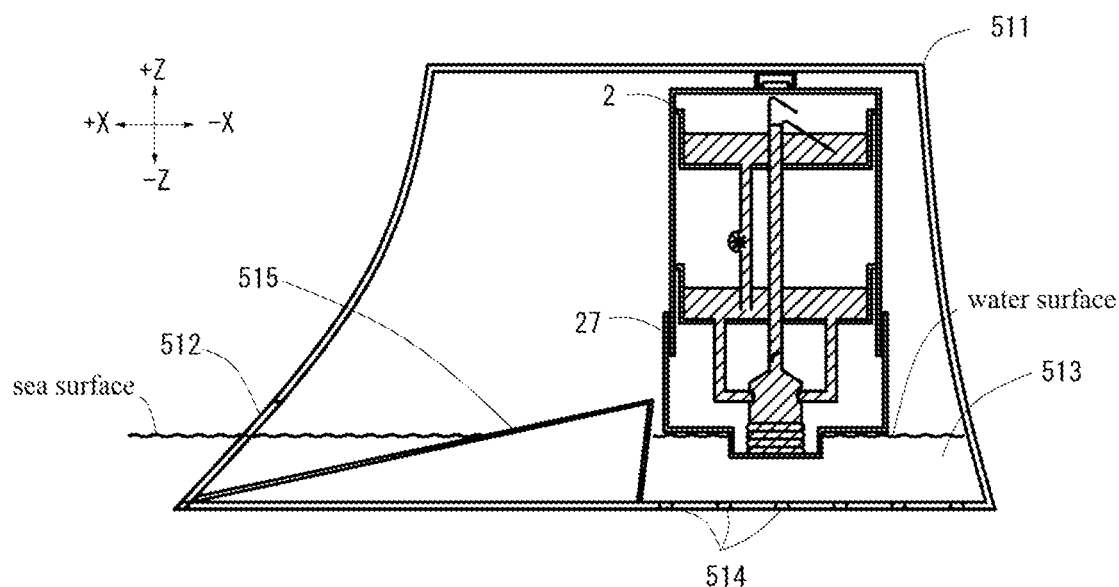
[Fig.25]
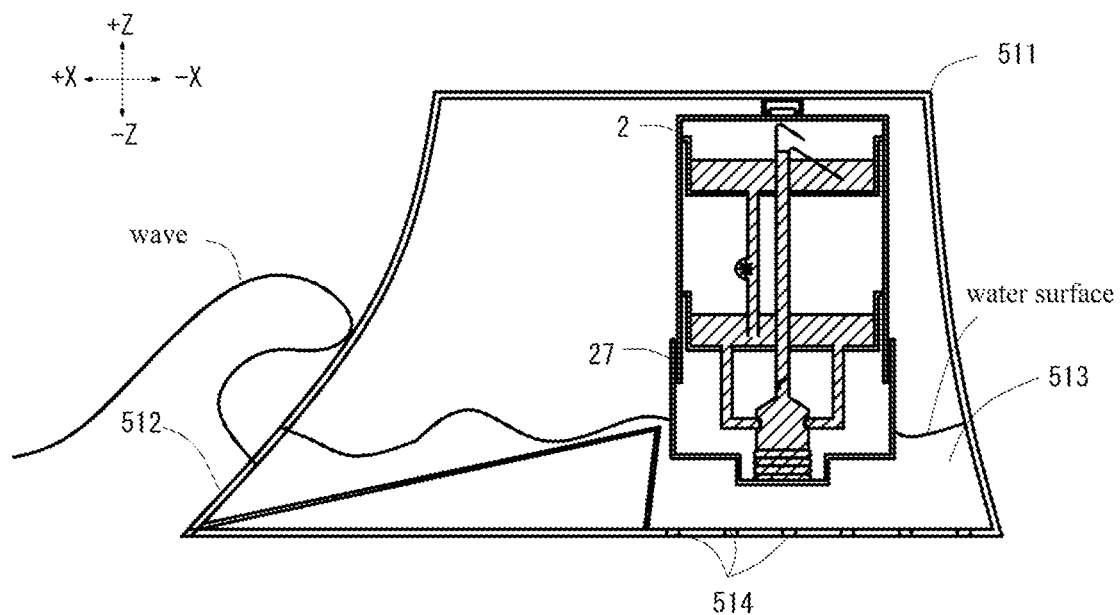

[Fig.26]
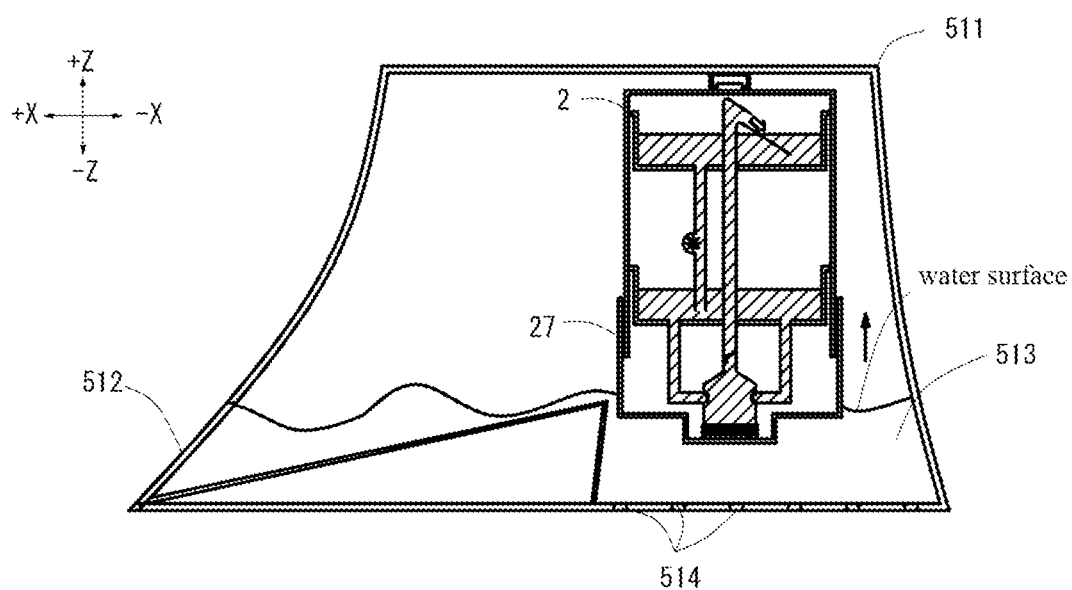
[Fig.27]
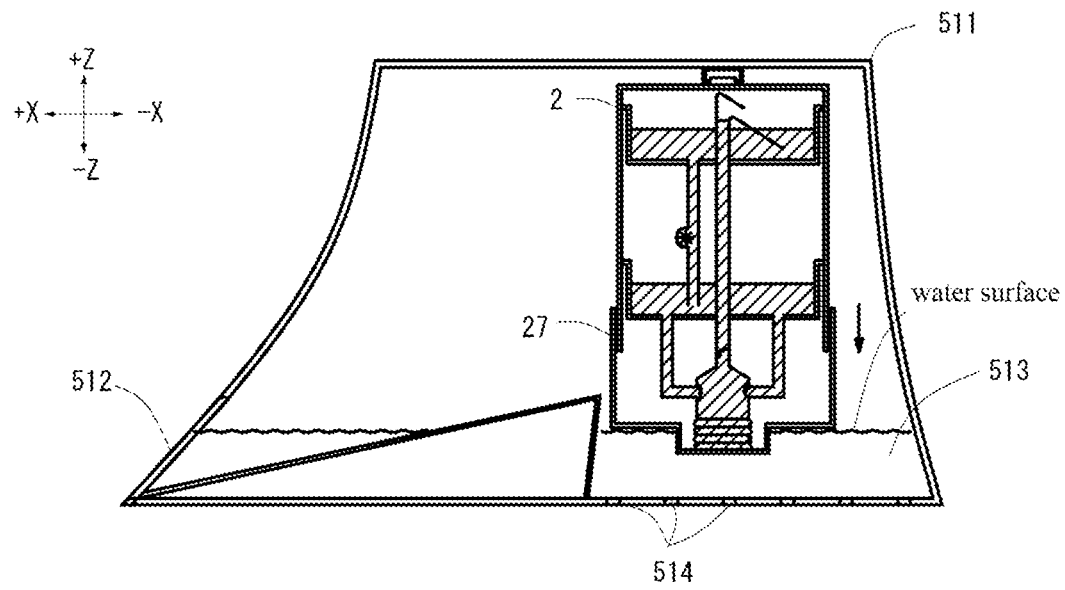

[Fig.28]
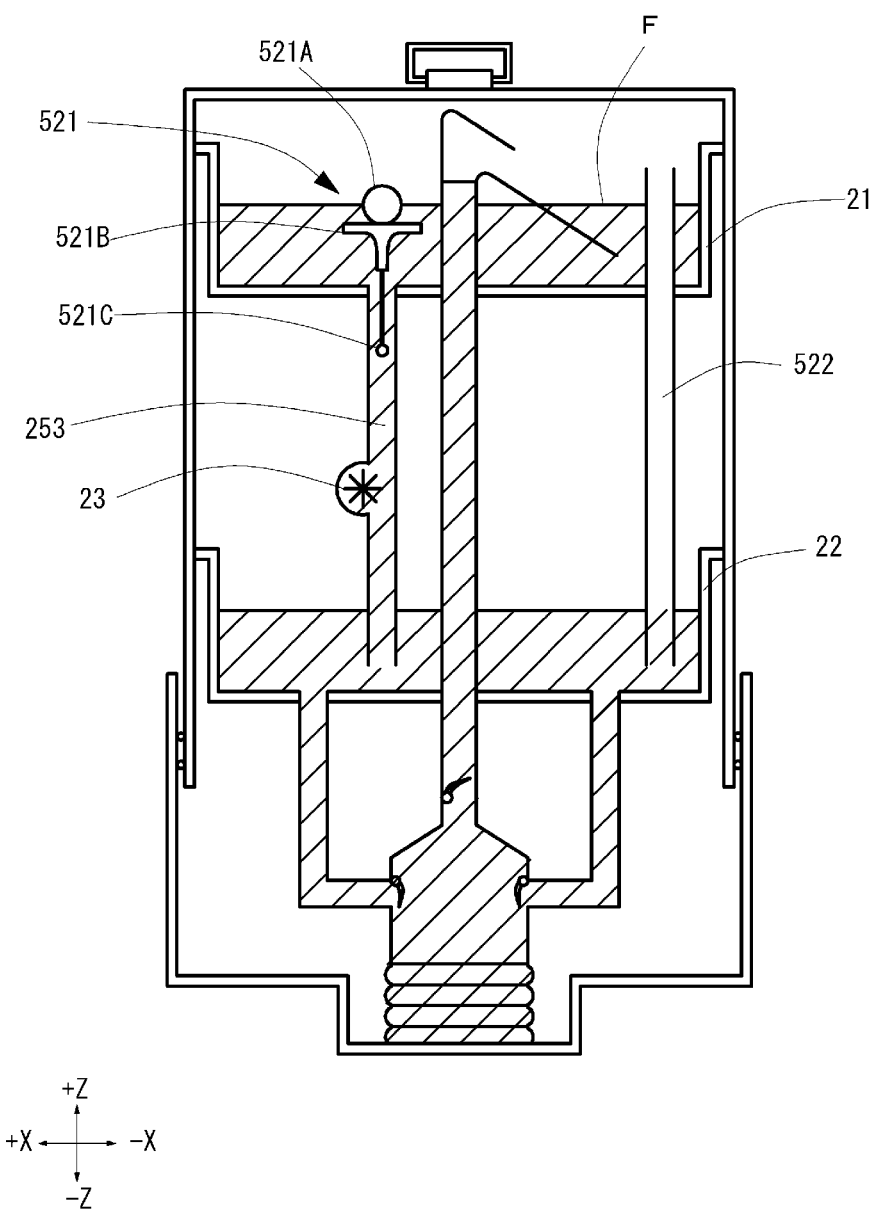

[Fig.29]
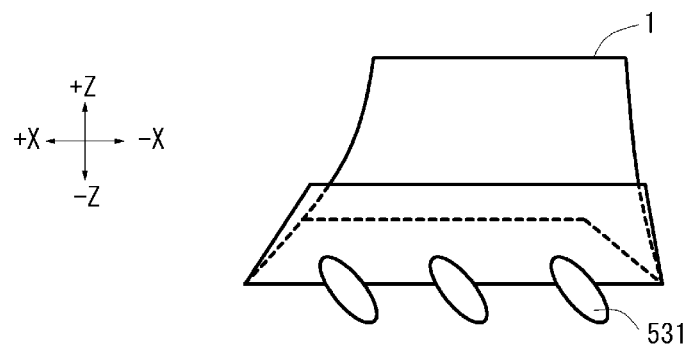
(a)
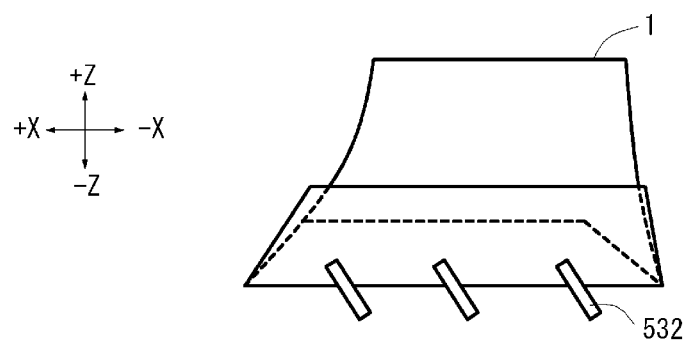
(b)
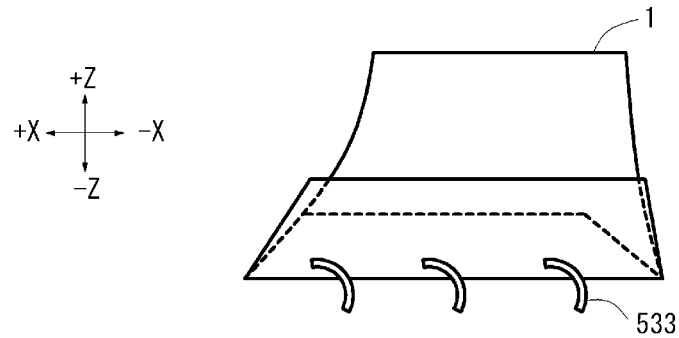
(c)

[Fig.30]
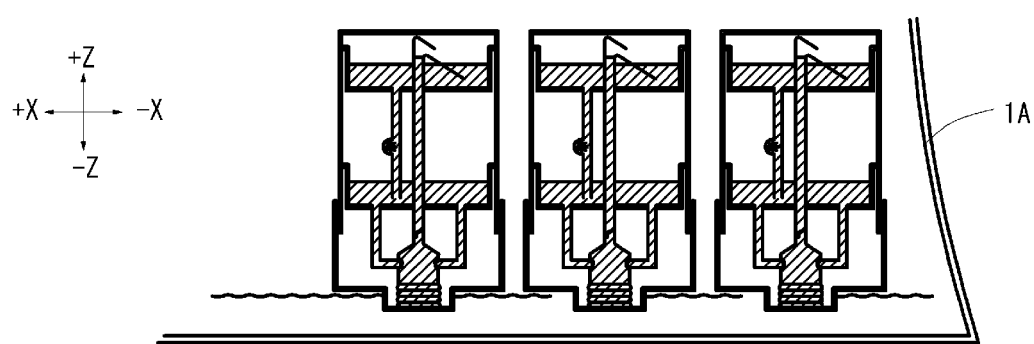
[Fig.31]
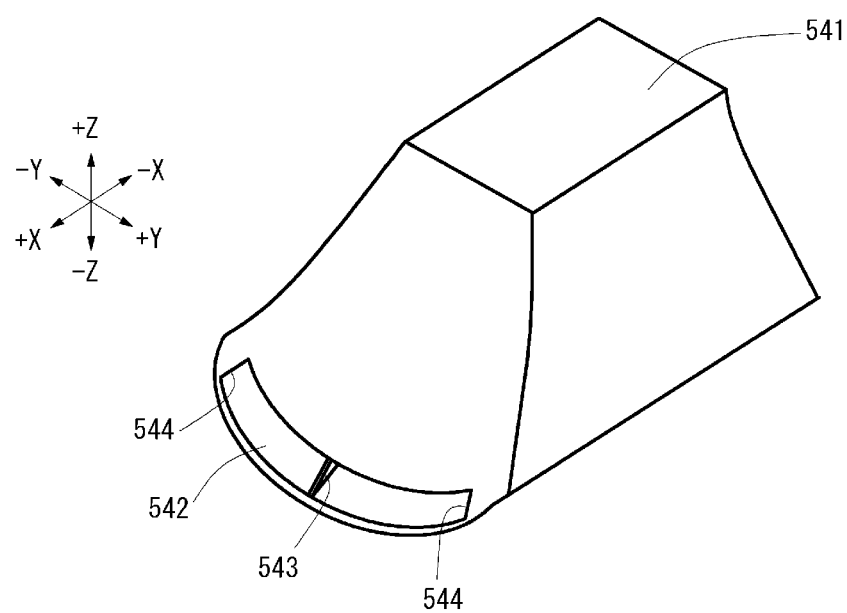

[Fig.32]
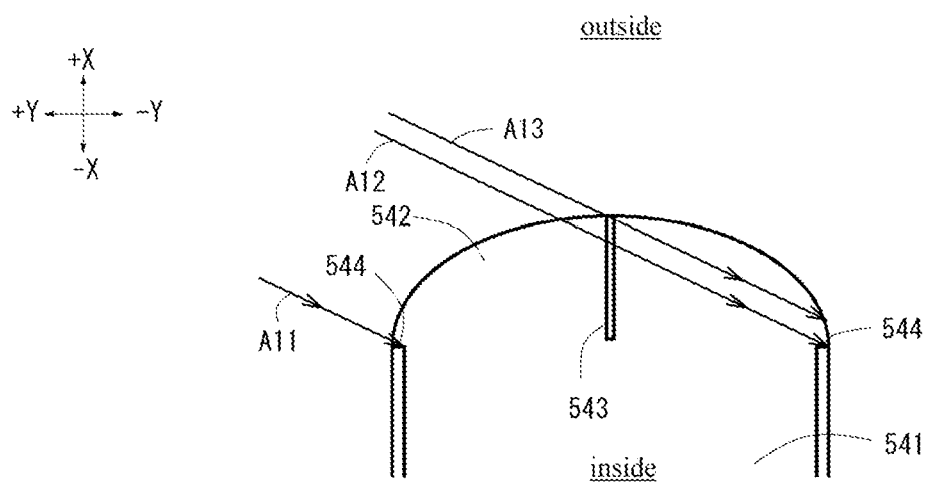
[Fig.33]
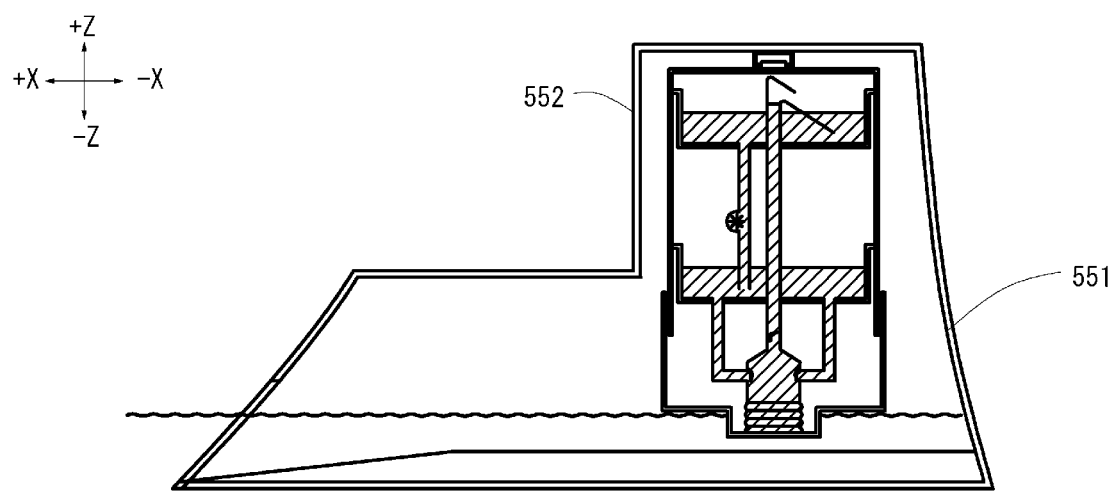

[Fig.34]
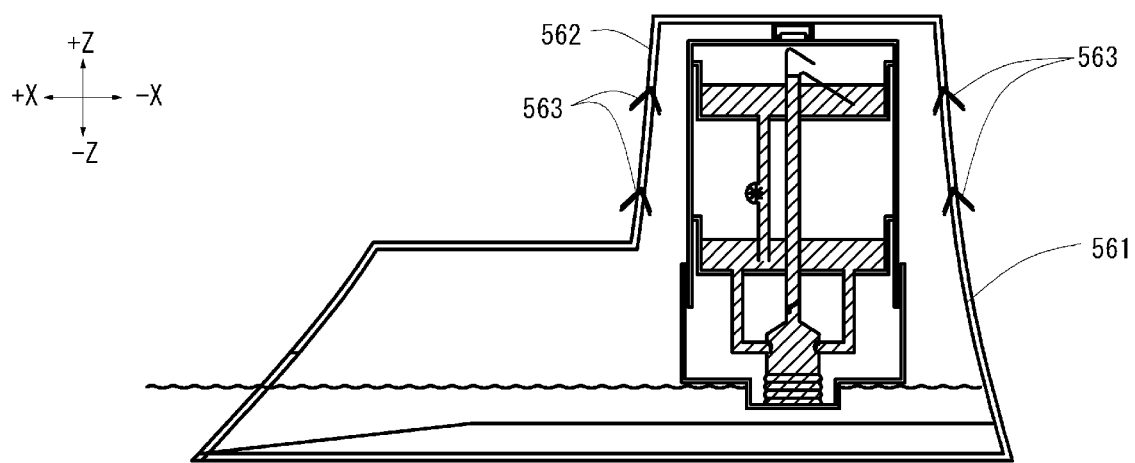

[Fig.35]
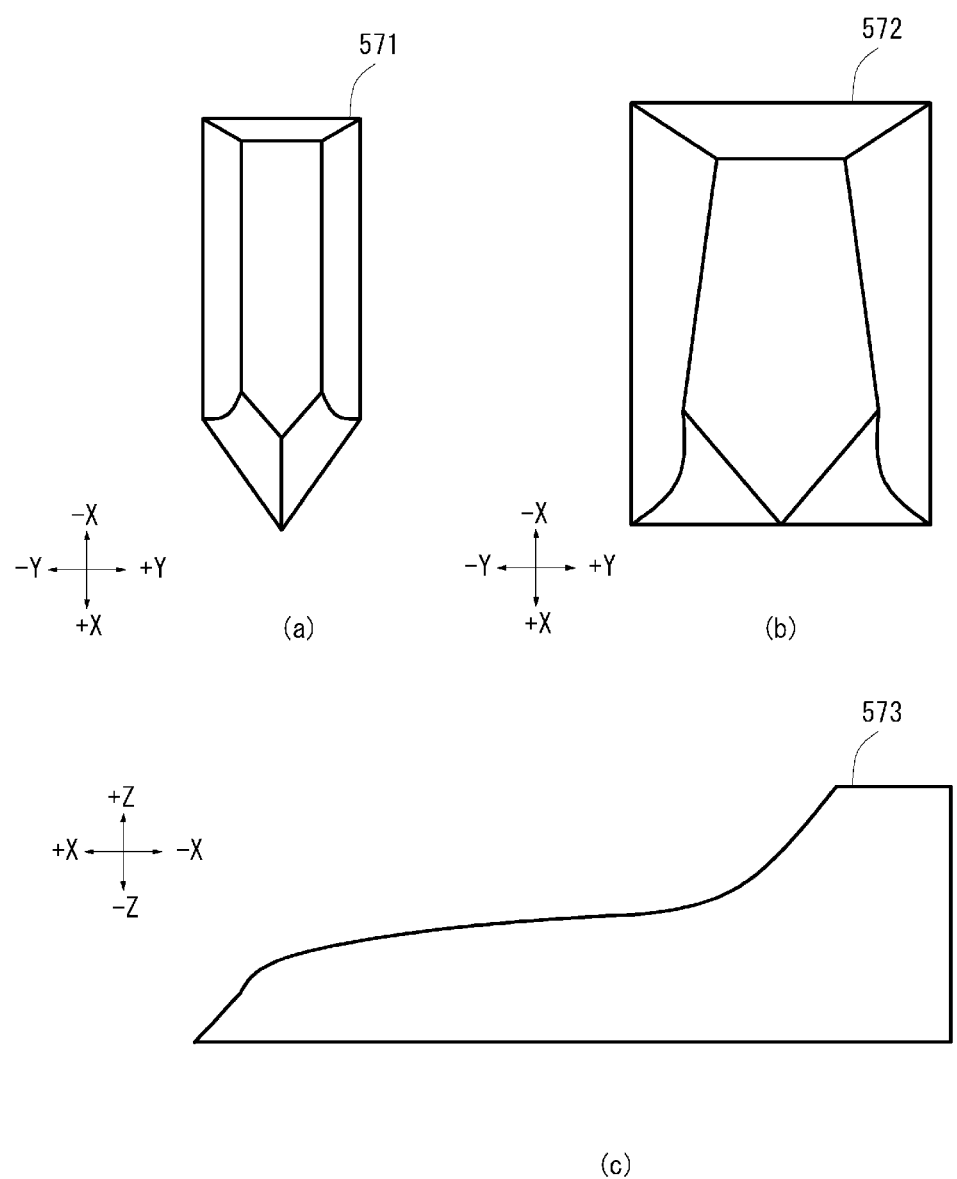

[Fig.36]
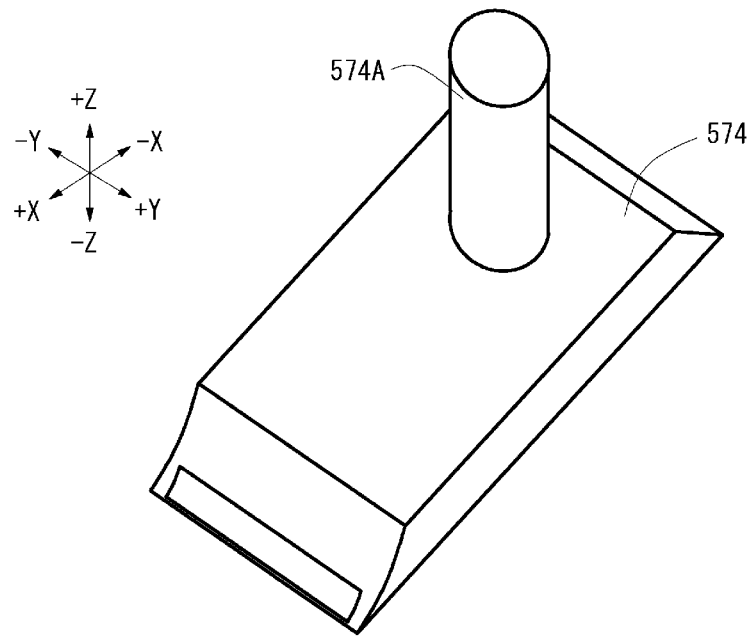
[Fig.37]
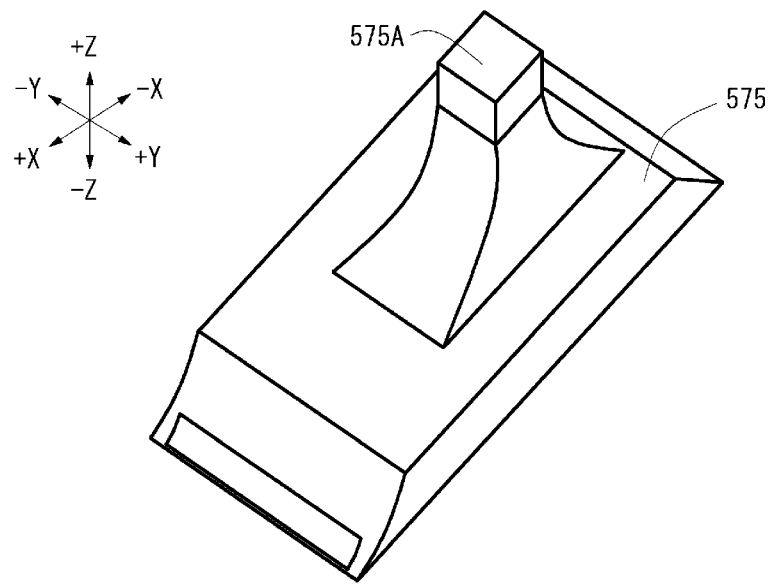

[Fig.38]
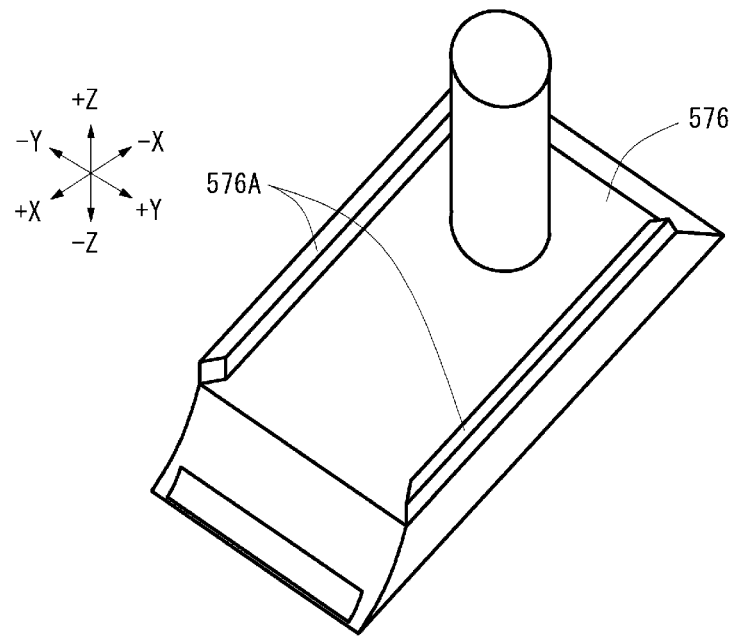
[Fig.39]
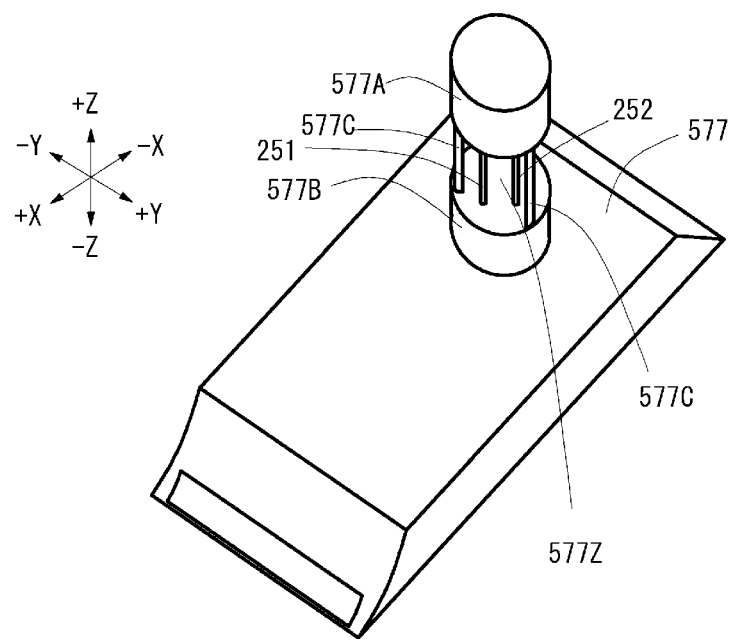

[Fig.40]
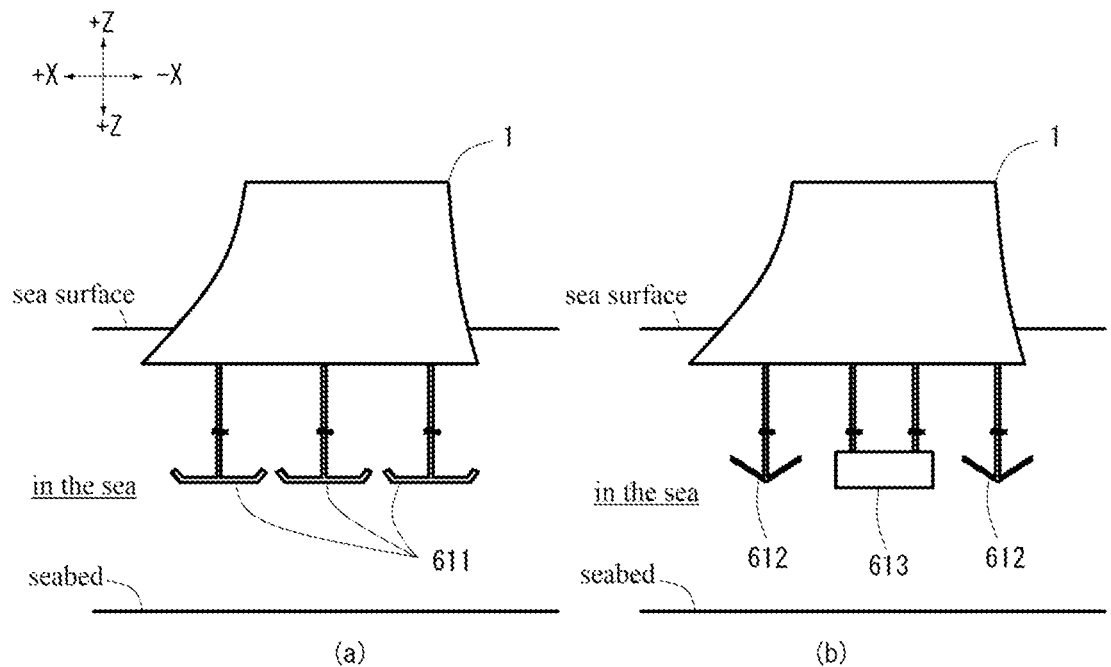
[Fig.41]
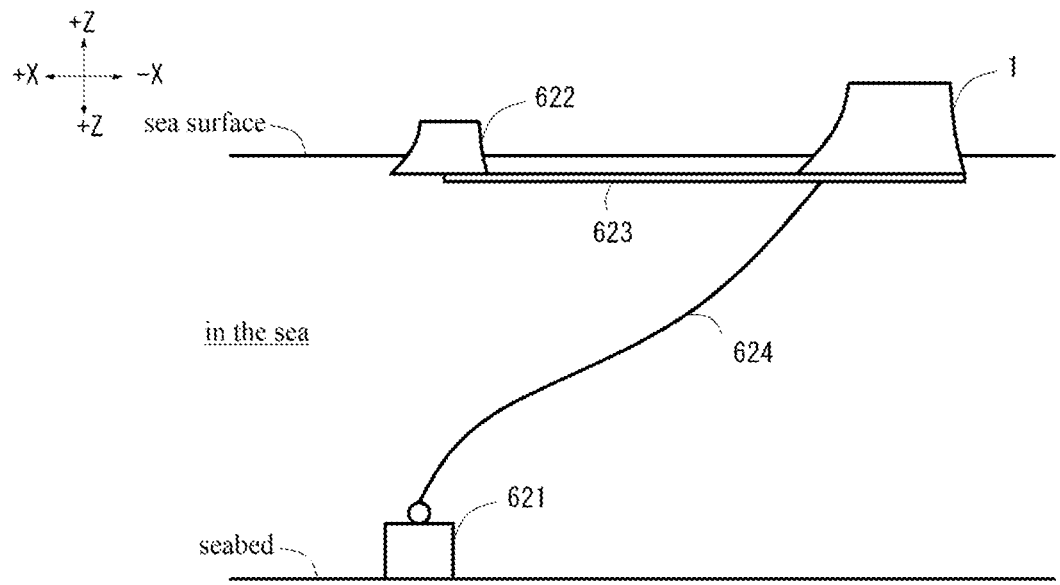

[Fig.42]
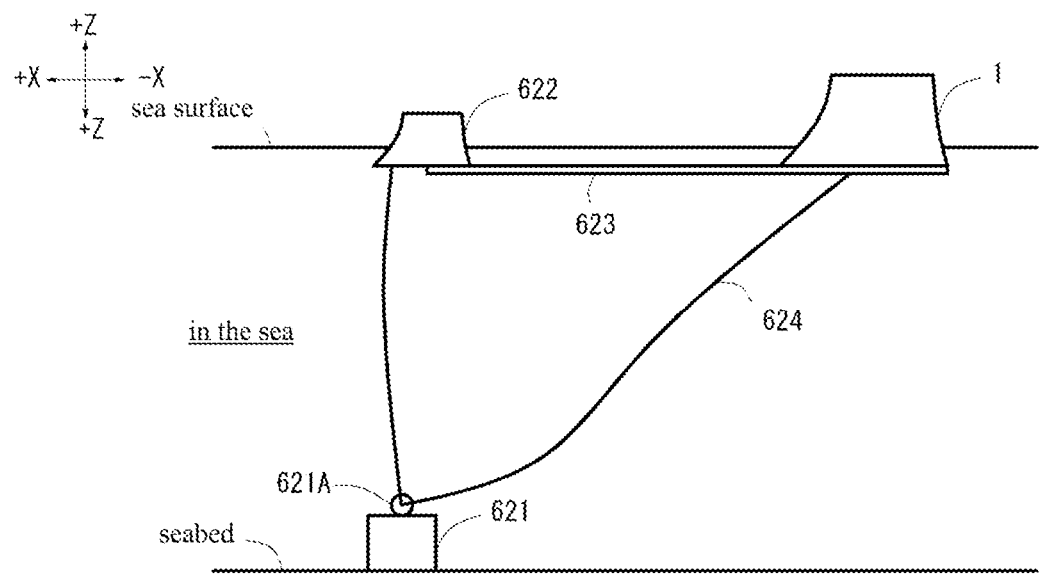
[Fig.43]
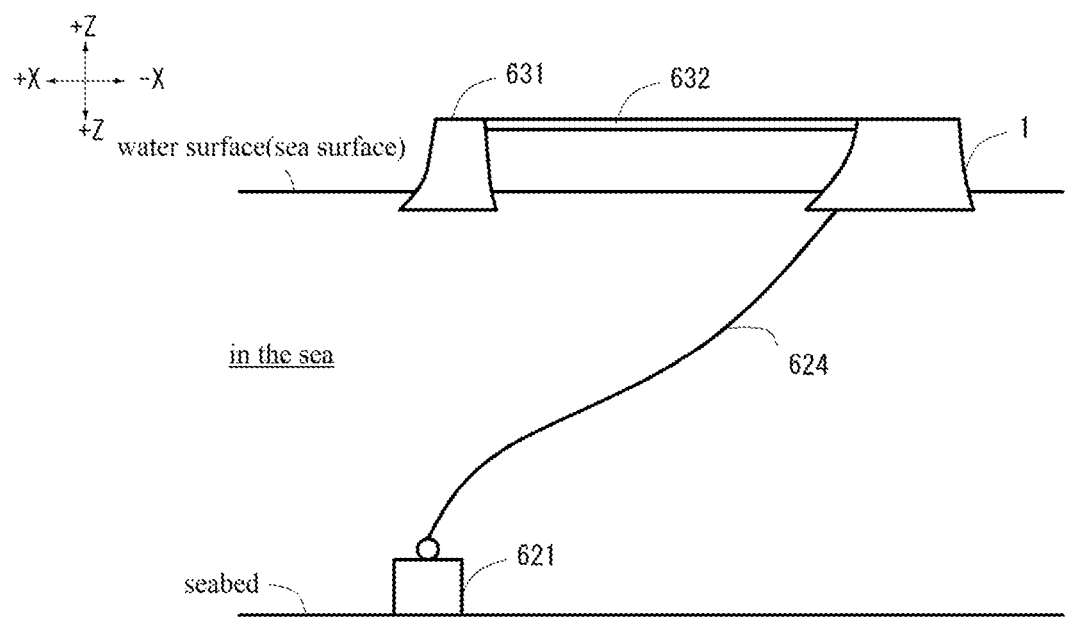

[Fig.44]
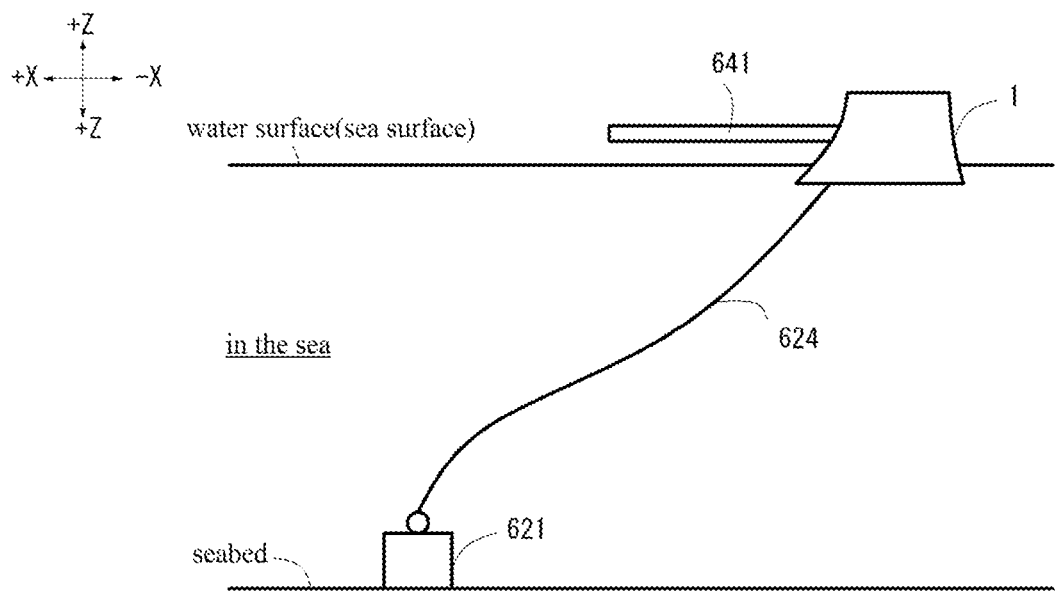
[Fig.45]
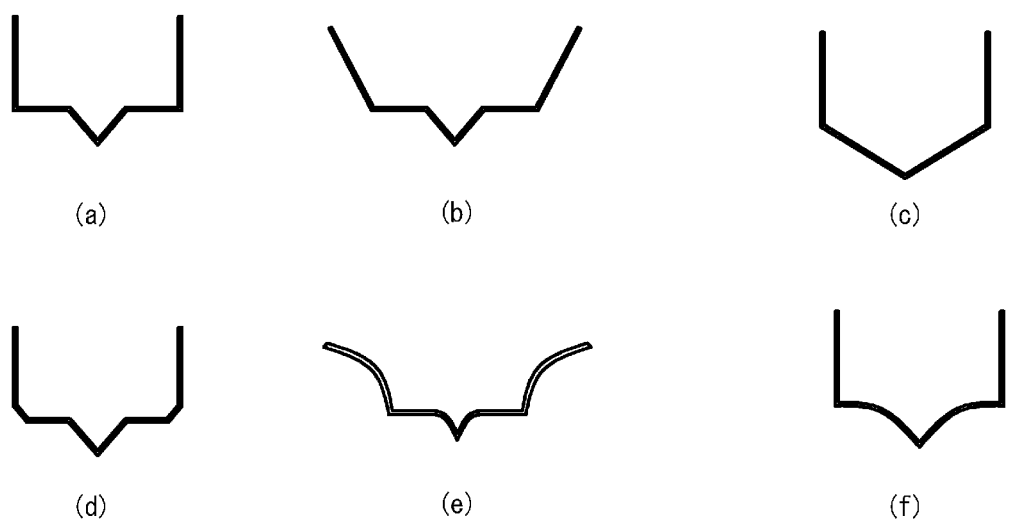
(a)　　　(b)　　　(c)
(d)　　　(e)　　　(f)

[Fig.46]
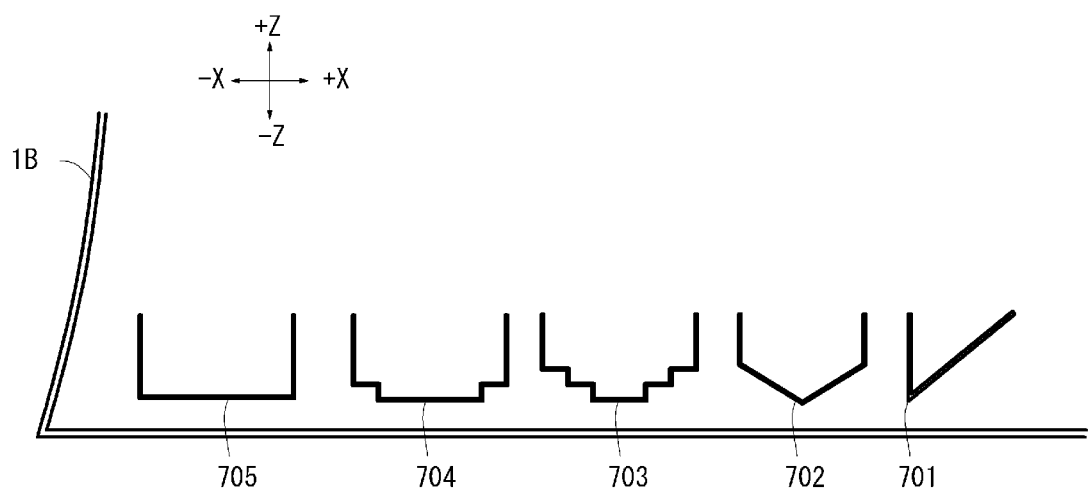
[Fig.47]
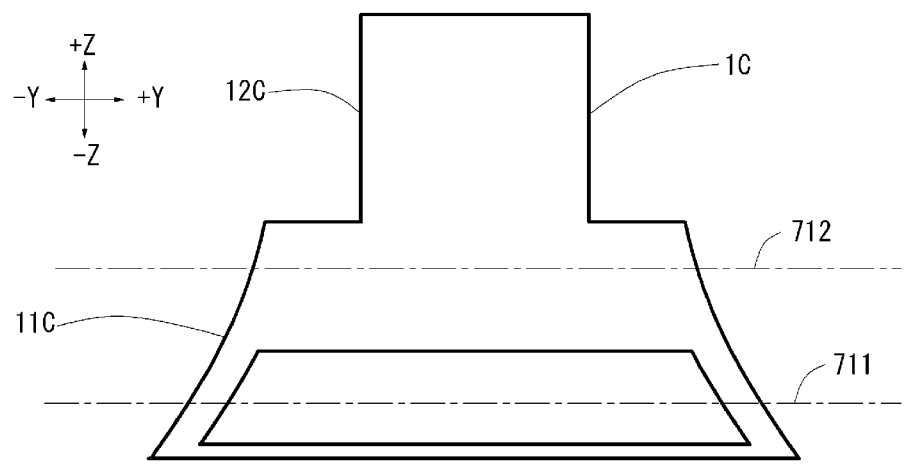

POWER GENERATION SYSTEM

CROSS REFERENCE TO RELATED APPLICATIONS

The present application is a continuation-in-part of PCT application No. PCT/JP2021/038539 filed on Oct. 19, 2021, the disclosure of which is incorporated by reference its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The present invention relates to a power generation system.

BACKGROUND ART

In the related art, there has been proposed a power generation device that generates electricity using water pumped up to a predetermined height position. Such a power generation device includes a generator motor driven as a generator during an electricity generation operation and driven as an electric motor during a pumping operation, and a pump turbine coupled to a drive shaft of the generator motor. The power generation device drives the electric motor to generate electricity by rotating the pump turbine using water flowing from an upper reservoir to a lower reservoir in the daytime where the amount of electric power consumption is large, and pumps water in the lower reservoir to the upper reservoir by receiving electric power supplied from the outside at night where the amount of electric power consumption is small, to drive the generator motor to rotate the water turbine.

CITATION LIST

Patent Literature

Patent Document 1: Japanese Unexamined Patent Application Publication No. 2003-166461

SUMMARY OF INVENTION

Technical Problem

However, in the power generation device of the related art, as described above, since the pumping operation is performed by receiving electric power supplied from the outside, there is a possibility that the expense required for the electric power increases, and there has been a desire for a reduction in the cost for generating electricity.

The invention has been made in view of the above-described circumstances, and an object of the invention is to provide a power generation system capable of generating electricity at low cost.

Solution to Problem

One aspect of the present invention provides a power generation system for generating electricity using a potential energy of a fluid raised to a predetermined height position by a wave force, the system comprising: a system-side accommodation member that floats, the system-side accommodation member including an intake opening portion for taking a wave into an inside of the system-side accommodation member on a front side of the system-side accommodation member; a floating body accommodated in the system-side accommodation member; a feeding device that feeds the fluid toward the predetermined height position based on a wave force received by the floating body due to the wave taken into the inside of the system-side accommodation member through the intake opening portion; and a power generation unit that generates the electricity using the potential energy of the fluid raised to the predetermined height position.

BRIEF DESCRIPTION OF DRAWINGS

FIG. 1 is a perspective view of a power generation device.
FIG. 2 is a side view of the power generation device.
FIG. 3 is a front view of the power generation device.
FIG. 4 is a front view of the power generation device.
FIG. 5 is a front view of the power generation device.
FIG. 6 is a cross-sectional view illustrating the inside of the power generation device.
FIG. 7 is an enlarged view of a part of FIG. 6.
FIG. 8 is a plan view illustrating the inside of the power generation device.
FIG. 9 is a view illustrating a circulation of a circulation fluid.
FIG. 10 is a view illustrating a circulation of the circulation fluid.
FIG. 11 is a view illustrating a circulation of the circulation fluid.
FIG. 12 is a view illustrating a circulation of the circulation fluid.
FIG. 13 is a view illustrating a circulation of the circulation fluid.
FIG. 14 is a cross-sectional view illustrating the inside of the power generation device.
FIG. 15 is a cross-sectional view illustrating the inside of the power generation device.
FIG. 16 is a cross-sectional view illustrating the inside of the power generation device.
FIG. 17 is a cross-sectional view illustrating the inside of the power generation device.
FIG. 18 is a view illustrating various shapes of floats.
FIG. 19 is a view illustrating a feeding device.
FIG. 20 is a cross-sectional view illustrating the inside of another power generation device.
FIG. 21 is a view illustrating an auxiliary feeding device.
FIG. 22 is a view illustrating a circulation of the circulation fluid.
FIG. 23 is a view illustrating a circulation of the circulation fluid.
FIG. 24 is a cross-sectional view illustrating the inside of a power generation device.
FIG. 25 is a cross-sectional view illustrating the inside of the power generation device.
FIG. 26 is a cross-sectional view illustrating the inside of the power generation device.
FIG. 27 is a cross-sectional view illustrating the inside of the power generation device.
FIG. 28 is a cross-sectional view illustrating the inside of a power generation device.
FIG. 29 is a side view of a power generation device.

FIG. 30 is a cross-sectional view illustrating a part of the inside of a power generation device.

FIG. 31 is a perspective view of a housing.

FIG. 32 is a plan view illustrating the inside of the housing.

FIG. 33 is a cross-sectional view illustrating the inside of a power generation device.

FIG. 34 is a cross-sectional view illustrating the inside of the power generation device.

FIG. 35 is a view illustrating housings.

FIG. 36 is a perspective view of a housing.

FIG. 37 is a perspective view of a housing.

FIG. 38 is a perspective view of a housing.

FIG. 39 is a perspective view of a housing.

FIG. 40 is a side view of the housing in a floated state.

FIG. 41 is a side view of the housing and the like in a floated state.

FIG. 42 is a side view of the housing and the like in a floated state.

FIG. 43 is a side view of the housing and the like in a floated state.

FIG. 44 is a side view of the housing and the like in a floated state.

FIG. 45 is a view illustrating various shapes of floats.

FIG. 46 is a cross-sectional view illustrating a part of the inside of a power generation device.

FIG. 47 is a front view of a housing.

DESCRIPTION OF EMBODIMENTS

An embodiment of a power generation system according to the invention will be described below in detail with reference to the accompanying drawings.

[I] Basic Concept of Embodiment

First, a basic concept of an embodiment will be described. The embodiment relates to a power generation system. The power generation system according to the invention is a system for generating electricity using the potential energy of a fluid raised to a predetermined height position by a wave force, and is, for example, a circulation-type pumped storage power generation system for generating electricity by circulating the fluid.

The "fluid" has fluidity. The "fluid" is a concept including, for example, liquids such as water and oil and semi-solids or solids such as a polymer gel; however, in the embodiment, the fluid will be described as a fluid formed of mixed water containing a chain polymer. In more detail, in the embodiment, a case where the "fluid" is a string-shaped micelle aqueous solution will be described.

[II] Specific Contents of Embodiment

Next, specific contents of the embodiment will be described.

(Configuration)

First, a configuration of a power generation device according to an embodiment will be described. FIG. 1 is a perspective view of the power generation device, FIG. 2 is a side view of the power generation device, FIGS. 3 to 5 are front views of the power generation device, FIG. 6 is a cross-sectional view illustrating the inside of the power generation device, FIG. 7 is an enlarged view of a part of FIG. 6, and FIG. 8 is a plan view illustrating the inside of the power generation device.

It should be noted that a description will be given based on the assumption that in each drawing, X, Y, and Z axes are orthogonal to each other, the Z axis indicates a vertical direction, a +Z direction is referred to as an upper side or upward (plane surface), and a −Z direction is referred to as a lower side or downward (bottom surface). In addition, a description will be given based on the assumption that the X axis indicates a horizontal direction (front-rear direction), and a +X direction is referred to as the front or front side, and a −X direction is referred to as the back or back side. In addition, a description will be given based on the assumption that the Y axis indicates a horizontal direction (left-right direction or side direction), a +Y direction is referred to as the right side surface, and a −Y direction is referred to as the left side surface.

In addition, in FIGS. 4 and 6, a power generation device 100 floated in the sea is illustrated, and a sea surface or a water surface is illustrated. It should be noted that in each drawing, the sea surface or the water surface is not illustrated as appropriate. It should be noted that the surface of seawater that has entered the inside of a housing 1 is referred to as the water surface. In addition, in FIG. 5, an internal structure of the power generation device 100 which can be seen through a front side opening portion 16 is also partially illustrated, and the internal structure is not illustrated in other drawings as appropriate. FIGS. 6 and 7 are illustrated for convenience of description. In addition, in each cross-sectional view, a circulation fluid F is illustrated by hatching. In addition, in FIG. 8, the outer shape of the housing 1 is illustrated by a one-dot chain line, a storage tank-side accommodation portion 2 and the like in FIG. 7 are not illustrated, and the outer shape of a float 27 and the like are illustrated. In addition, in each drawing, in order to describe each configuration of the power generation device 100, some elements other than objects to be described are not illustrated as appropriate.

The power generation device 100 in FIG. 1 is a power generation system that generates electricity using the potential energy of the circulation fluid F (FIG. 7) raised to a predetermined height position by a wave force. It should be noted that the shape of the power generation device 100 is, unless otherwise specified, left-right symmetrical with respect to an X-Z plane passing through the center of the power generation device 100, with the left and right sides having the same shape and size, and in the following description, only one side is denoted by a reference sign as appropriate, and will be described.

The power generation device 100 in FIG. 1 is a device that is used in the sea in a floating manner and that generates electricity, and for example, is used in a floating manner while maintaining a state where waves come toward the front side of the power generation device 100 with the front side (side on which the front side opening portion 16 is provided) of the power generation device 100 facing an offshore direction (namely, a direction in which waves surge).

The power generation device 100 includes, for example, the housing 1 in FIG. 1, the storage tank-side accommodation portion 2 in FIG. 7, an upper storage tank 21, a lower storage tank 22, a power generation unit 23, a feeding device 24, a first pipe 251, a second pipe 252, a third pipe 253, a first pipe-side check valve 261, a second pipe-side check valve 262, and the float 27.

It should be noted that the circulation fluid F is the above-described fluid, specifically, a fluid that is circulated in the power generation device 100 to be used for the generation of electricity in the power generation unit 23, and is, for example, a liquid formed of mixed water containing a chain polymer (in detail, a string-shaped micelle aqueous solution).

(Configuration—Housing)

The housing 1 in FIGS. 1 to 6 is a system-side accommodation member that accommodates elements of the power generation device 100. Specifically, the housing 1 is floated in the sea (namely, floats in the sea), and has, for example, a box shape including a hollow portion 10 in FIG. 6. The material of the housing 1 is optional, and may be a metal, a resin, a combination thereof, or any other material. In addition, since the housing 1 is floated in the sea, elements for increasing buoyancy, such as known floats, may be provided at any positions or the housing 1 may be made of a material that increases buoyancy.

The housing 1 includes, for example, a housing-side front portion 11, housing-side side portions 12, a housing-side back portion 13, outer flow paths 14, a front side inclined portion 15, and the front side opening portion 16 that are illustrated in FIG. 1, and an internal front side inclined portion 17, internal side inclined portions 18, and an internal bottom portion 19 that are illustrated in FIGS. 5 and 8.

(Configuration—Housing—Housing-Side Front Portion)

The housing-side front portion 11 in FIG. 1 is a suppressing member, and is a first outer inclined portion. For example, the housing-side front portion 11 is a partition wall that forms a front side (+X direction) of the housing 1 and that partitions the inside and the outside of the housing 1. The "suppressing member" is a member that suppresses swing of the housing 1 caused by a wave of a predetermined wave height or more by causing at least a part of the housing 1 to submerge in water (namely, in the sea) when receiving the wave.

For example, as illustrated in FIG. 2, the housing-side front portion 11 is curved and inclined toward the back side (−X direction) as the housing-side front portion 11 extends toward the upper side (+Z direction), namely, the housing-side front portion 11 is inclined such that a wave of a predetermined wave height or more (as one example, a wave height that reaches a position higher than an upper end portion of the front side opening portion 16 in FIG. 4, 2 m to 3 m or more or the like) rises up the housing-side front portion 11 when receiving the wave.

It should be noted that, here, the case where the housing-side front portion 11 is curved and inclined has been described; however, for example, the housing-side front portion 11 may be inclined in a straight state without being curved (the same applies to the housing-side side portions 12). In addition, "a wave rising up" may be interpreted as, for example, a concept including seawater rising up due to a force of the wave.

(Configuration—Housing—Housing-Side Side Portion)

The housing-side side portions 12 in FIG. 1 are the suppressing member, and are first outer inclined portions. For example, the housing-side side portions 12 are partition walls that form both side surface sides (+Y direction and −Y direction) of the housing 1 and that partition the inside and the outside of the housing 1. For example, as illustrated in FIG. 4, the housing-side side portions 12 on both sides are curved and inclined to approach each other as the housing-side side portions 12 extend toward the upper side (+Z direction), namely, the housing-side side portions 12 are inclined such that a wave of a predetermined wave height or more (as one example, a wave height that reaches a position higher than upper end portions of flow path side wall portions 141 in FIG. 4, 2 m to 3 m or more or the like) rises up the housing-side side portions 12 when receiving the wave.

(Configuration—Housing—Housing-Side Back Portion)

The housing-side back portion 13 in FIG. 1 is, for example, a partition wall that forms the back side (−X direction) of the housing 1 and that partitions the inside and the outside of the housing 1. The shape of the housing-side back portion 13 is optional, and for example, may be a shape inclined similarly to the housing-side front portion 11, or may be other shapes. In the present embodiment, the housing-side back portion 13 configured to have a slightly inclined shape is illustrated.

(Configuration—Housing—Outer Flow Path)

The outer flow paths 14 in FIG. 1 are the suppressing member. For example, as illustrated in FIG. 4, the outer flow paths 14 are provided on both side surfaces of the housing 1, as illustrated in FIG. 2, extend between the front side (+X direction) and the back side (−X direction) of the housing 1, and are configured such that a wave of a predetermined wave height or more (as one example, a wave height higher than the height of flow path bottom portions 142 or the upper end portions (+Z direction) of the flow path side wall portions 141, 2 m to 3 m or more or the like) rises up the outer flow paths 14 when receiving the wave. For example, as illustrated in FIGS. 2 to 4, each of the outer flow paths 14 is a flow path surrounded by the flow path side wall portion 141 having a predetermined height, the flow path bottom portion 142, and a part of the housing-side side portion 12.

(Configuration—Housing—Front Side Inclined Portion)

The front side inclined portion 15 in FIG. 1 is the suppressing member and is a second outer inclined portion, and for example, as illustrated in FIGS. 1 to 4, is provided on the front side (+X direction) of the housing 1. The front side inclined portion 15 is continuous with the outer flow paths 14, and is configured to guide a wave of a predetermined wave height or more to the outer flow paths 14 when receiving the wave. It should be noted that the front side inclined portion 15 may be continuously formed on the same surface as a front side (+X direction) surface of the housing-side front portion 11, or may be formed as a surface other than the front side surface by providing a step with respect to the front side surface. It should be noted that "guiding a wave" may be interpreted as, for example, a concept including guiding seawater supplied by the wave and guiding the wave itself.

(Configuration—Housing—Front Side Opening Portion)

The front side opening portion 16 in FIG. 1 is an intake opening portion for taking a wave into the inside of the housing 1. The front side opening portion 16 is, for example, an opening provided in the housing-side front portion 11, and is an opening communicating with the hollow portion 10 (FIG. 6). For example, as illustrated in FIG. 4, the front side opening portion 16 has a substantially rectangular shape in a front view. The front side opening portion 16 is formed, for example, such that a distance D1 (FIG. 4) from the sea surface to the upper end portion (+Z direction) of the front side opening portion 16 when there are no waves in a state where the housing 1 is floated in the sea is a predetermined distance.

A specific value of the distance D1 is optional, and for example, an experiment, a simulation, or the like for confirming a relationship between the up-down movement of the float 27 of the power generation device 100 illustrated in FIG. 7 and the wave height of a wave to be taken in may be performed, and the distance D1 may be set such that a wave of a wave height which appropriately moves the float 27 up and down to generate electricity is taken in, and as one example, may be set to approximately 50 cm to 100 cm. It should be noted that "taking in a wave" may be interpreted as, for example, a concept including taking in seawater supplied by the wave and taking in the wave itself.

(Configuration—Housing—Internal Front Side Inclined Portion)

The internal front side inclined portion 17 in FIGS. 5, 6, and 8 is a first inner inclined portion extending from the front side opening portion 16 toward the float 27 inside the housing 1, and is a first inner inclined portion inclined to be located upward (+Z direction) as the first inner inclined portion extends away from the front side opening portion 16.

Since the internal front side inclined portion 17 is provided, in the hollow portion 10, the water depth becomes gradually shallower from the front side opening portion 16 toward the float 27 (FIG. 6). As a result, the wave height of a wave taken into the hollow portion 10 of the housing 1 from the outside through the front side opening portion 16 gradually increases as the wave moves toward the float 27, and a wave of a wave height that appropriately moves the float 27 up and down is supplied to the float 27.

(Configuration—Housing—Internal Side Inclined Portion)

The internal side inclined portions 18 in FIGS. 5 and 8 are second inner inclined portions that are provided on both sides of the internal front side inclined portion 17 inside the housing 1, and are second inner inclined portions inclined more steeply than the internal front side inclined portion 17. For example, the internal side inclined portions 18 are inclined more gently than inner wall portions 18A. It should be noted that the inner wall portions 18A are vertically erected walls provided on opposite sides of the respective internal side inclined portions 18 from the internal front side inclined portion 17 with respect to the left-right direction (Y direction).

By providing the internal side inclined portions 18, waves taken into the hollow portion 10 of the housing 1 from the outside through the front side opening portion 16 can be prevented from directly hitting the inner wall portions 18A and being reflected, and the waves can be supplied to the back of the housing 1 (namely, a float 27 side).

(Configuration—Housing—Internal Bottom Portion)

The internal bottom portion 19 in FIGS. 5, 6, and 8 is a bottom of the hollow portion 10 of the housing 1, and is, for example, flat.

(Configuration—Storage Tank-Side Accommodation Portion)

The storage tank-side accommodation portion 2 in FIGS. 6 and 7 is a storage member-side accommodation member that accommodates the upper storage tank 21, the lower storage tank 22, and the like, and for example, as illustrated in FIG. 6, is provided in a state where the storage tank-side accommodation portion 2 is suspended from an upper portion (+Z side) of the housing 1 inside the housing 1 so as to be swingable with respect to the housing 1 via a suspension portion 20. Since the storage tank-side accommodation portion 2 is suspended from the housing 1, even when the housing 1 swings upon receiving a wave, the storage tank-side accommodation portion 2 swings independently of the housing 1, so that the magnitude of the swing of the housing 1 can be prevented from being directly transmitted to the storage tank-side accommodation portion 2, and the magnitude of the swing of the storage tank-side accommodation portion 2 (in detail, the swing of the upper storage tank 21, the lower storage tank 22, and the like that are accommodated therein) can be reduced.

It should be noted that a method for attaching the storage tank-side accommodation portion 2 is not limited to the suspension method, and for example, the storage tank-side accommodation portion 2 may be fixedly provided with respect to the upper portion of the housing 1 using any method (welding, a method that uses a metal fitting for fixing, or the like).

The storage tank-side accommodation portion 2 has, for example, a roughly box shape including a hollow portion, has a shape covering objects to be accommodated (the upper storage tank 21, the lower storage tank 22, and the like) from the upper side (+Z direction) and the sides, and has a shape of which the lower side (−Z direction) is open.

(Configuration—Upper Storage Tank)

The upper storage tank 21 in FIG. 7 is a storage member that stores the circulation fluid F. Specifically, the upper storage tank 21 is an upper storage member provided at a predetermined height position, and is an upper storage member that stores the circulation fluid F fed by the feeding device 24. The position where the upper storage tank 21 is provided is optional as long as the position is higher than the power generation unit 23, and may be determined, for example, by performing various experiments, simulations, or the like related to the generation of electricity in the power generation unit 23. The upper storage tank 21 is fixed to, for example, a storage tank-side accommodation portion 2 side.

(Configuration—Lower Storage Tank)

The lower storage tank 22 in FIG. 7 is a storage member that stores the circulation fluid F. Specifically, the lower storage tank 22 is a lower storage member provided below the upper storage tank 21, and is a lower storage member that stores the circulation fluid F supplied from the upper storage tank 21. The position where the lower storage tank 22 is provided is optional as long as the position is lower than the power generation unit 23 and the upper storage tank 21, and may be determined, for example, by performing various experiments, simulations, or the like related to the generation of electricity. The lower storage tank 22 is fixed to, for example, the storage tank-side accommodation portion 2 side.

(Configuration—Power Generation Unit)

The power generation unit 23 in FIG. 7 is a power generation unit that generates electricity using the potential energy of the circulation fluid F raised to the predetermined height position, and specifically, is a power generation unit that generates electricity using the circulation fluid F supplied from the upper storage tank 21 to the lower storage tank 22. The power generation unit 23 is, for example, a device that generates electricity using the energy of the circulation fluid F flowing (descending) through the third pipe 253 due to its own weight, and can be configured using a known generator. The power generation unit 23 is provided, for example, at a predetermined position in the third pipe 253.

(Configuration—Feeding Device)

The feeding device 24 in FIG. 7 is a feeding device that feeds the circulation fluid F toward the predetermined height position based on a wave force received by the float 27, and is a feeding device accommodated in a hollow portion 27A of the float 27. The feeding device 24 is, for example, a first feeding device that feeds the circulation fluid F to the predetermined height position when the float 27 moves upward based on the wave force. For example, the feeding device 24 is a device which supplies the circulation fluid F to the upper storage tank 21 by raising the circulation fluid F through the first pipe 251, and to which the circulation fluid F is supplied through the second pipe 252. The feeding device 24 includes, for example, a bellows tube 241 and a duct tube 242.

(Configuration—Feeding Device—Bellows Tube)

The bellows tube 241 in FIG. 7 is a bellows tube in which the circulation fluid F is stored, and is a bellows tube of which the internal volume (namely, the volume of a hollow portion of the bellows tube 241) increases or decreases according to the up-down movement of the float 27 based on the wave force. The bellows tube 241 includes a hollow portion communicating with a hollow portion of the duct tube 242, and the circulation fluid F is movable between the hollow portion of the bellows tube 241 and the hollow portion of the duct tube 242 inside the feeding device 24.

An upper end portion (+Z direction) of the bellows tube 241 is fixedly connected to a lower end (−Z direction) of the duct tube 242, and a lower end portion (−Z direction) of the bellows tube 241 is fixed to a bottom of the float 27. When the float 27 moves to the upper side (+Z direction), the bellows tube 241 is pushed by the float 27 to contract, and the volume of the bellows tube 241 decreases. On the other hand, when the float 27 moves to the lower side (−Z direction), the bellows tube 241 is pulled by the float 27 to expand, and the volume of the bellows tube 241 increases.

(Configuration—Feeding Device—Duct Tube)

The duct tube 242 in FIG. 7 is a feeding flow path that communicates with the bellows tube 241, and is a feeding flow path that feeds the circulation fluid F based on an increase or decrease in the volume of the bellows tube 241. For example, the first pipe 251 and the second pipe 252 are connected to the duct tube 242. The duct tube 242 includes, for example, a portion (lower portion in the drawing) having the same flow path diameter in a height direction (Z-axis direction), and a portion that is reduced in flow path diameter as the portion extends toward the upper side (+Z direction). For example, the duct tube 242 is fixedly provided on the storage tank-side accommodation portion 2 side, and may be made of metal or resin.

(Configuration—First Pipe)

The first pipe 251 in FIG. 7 is a first supply flow path that supplies the circulation fluid F fed by the feeding device 24 to the predetermined height position. For example, the first pipe 251 is fixedly provided on the storage tank-side accommodation portion 2 side (the same applies to the second pipe 252 and the third pipe 253). A lower end portion of the first pipe 251 is connected to the feeding device 24, and an upper end portion 251A of the first pipe 251 is provided on an upper storage tank 21 side.

The upper end portion 251A is configured to reduce frictional resistance between the circulation fluid F supplied to the predetermined height position (namely, the upper storage tank 21) and the first pipe 251, and to suppress foaming of the circulation fluid F when the circulation fluid F is supplied to the predetermined height position. The upper end portion 251A includes, for example, a guide plate 251B and an open portion 251C.

The guide plate 251B is used to suppress foaming of the circulation fluid F, and is a portion that guides the circulation fluid F to a bottom portion side of the upper storage tank 21. The circulation fluid F gently flows on the guide plate 251B and is supplied to the upper storage tank 21, thereby suppressing foaming.

The open portion 251C is a portion for reducing frictional resistance between the circulation fluid F and the first pipe 251, and is a portion that is open on the upper side (+Z direction) of the guide plate 251B. By providing the open portion 251C, the contact area between the circulation fluid F and the upper end portion 251A can be reduced, and the frictional resistance is reduced.

(Configuration—Second Pipe)

The second pipe 252 in FIG. 7 is a second supply flow path that returns the circulation fluid F at the predetermined height position to the feeding device 24, and specifically, is a flow path that returns the circulation fluid F in the upper storage tank 21 to the feeding device 24 via the lower storage tank 22. A lower end portion of the second pipe 252 is connected to the feeding device 24, and an upper end portion of the second pipe 252 is connected to a bottom of the lower storage tank 22.

For example, a total of two second pipes 252 are provided on both sides of the first pipe 251. The flow path diameter of the second pipes 252 is optional, and for example, from the viewpoint of appropriately circulating the circulation fluid F, it is preferable that a total flow path diameter of the second pipes 252 is larger than a total flow path diameter of the first pipe 251. In the present embodiment, it is assumed that one first pipe 251 and two second pipes 252 are provided for one feeding device 24 and a total flow path diameter of the two second pipes 252 is configured to be larger than a flow path diameter of the one first pipe 251.

(Configuration—Third Pipe)

The third pipe 253 in FIG. 7 is a flow path for supplying the circulation fluid F to the power generation unit 23. A lower end portion of the third pipe 253 is provided on a lower storage tank 22 side, and an upper end portion of the third pipe 253 is connected to a bottom of the upper storage tank 21.

(Configuration—Check Valve)

The first pipe-side check valve 261 in FIG. 7 allows the circulation fluid F to flow in a direction indicated by an arrow in FIG. 7 (direction from the feeding device 24 toward the upper storage tank 21), and prevents a backflow. The second pipe-side check valves 262 allow the circulation fluid F to flow in a direction indicated by arrows in FIG. 7 (direction from the lower storage tank 22 toward the feeding device 24), and prevent a backflow.

(Configuration—Float)

The float 27 in FIGS. 6 and 7 is a floating body that is floated (floats) in seawater, which is taken into the hollow portion 10 through the front side opening portion 16, inside the housing 1, and specifically, moves up and down based on the force of a wave (wave force) taken into the hollow portion 10 through the front side opening portion 16. The float 27 includes the hollow portion 27A in which the feeding device 24 and the like are accommodated.

The float 27 has, for example, a box shape of which the upper side (+Z direction) is open. For example, as illustrated in FIG. 8, the float 27 has a rectangular outer shape in a plan view, and includes a first portion 271 and a second portion 272 in FIG. 7.

The first portion 271 in FIG. 7 is connected to a lower end portion (−Z direction) of the storage tank-side accommodation portion 2 such that the float 27 can move (namely, move up and down) toward the upper side (+Z direction) or the lower side (−Z direction) with respect to the storage tank-side accommodation portion 2. The connection method is optional, and for example, as illustrated in FIG. 7, after configuring an upper end portion (+Z direction) of the first portion 271 so as to have a slightly larger diameter than the lower end portion of the storage tank-side accommodation portion 2, a method for connecting the first portion 271 and the storage tank-side accommodation portion 2 with a member (for example, a spherical sliding member or the like) for reducing the friction force between the end portions facing each other interposed therebetween may be applied. It should be noted that the float 27 may be configured to move up and down with respect to the storage tank-side accommodation portion 2, and the first portion 271 may not be connected to the storage tank-side accommodation portion 2.

The second portion 272 in FIG. 7 is a portion protruding from a lower portion (−Z direction) of the first portion 271. A cross-sectional area of the second portion 272 is smaller than a cross-sectional area of the first portion 271 with respect to the horizontal direction. Since the second portion 272 is provided, a lower portion (−Z direction) of the float 27 protrudes such that the cross-sectional area in the horizontal direction decreases as the float 27 extends downward (−Z direction).

By providing the second portion 272, the buoyancy of the float 27 can be increased or decreased in a stepwise manner. For example, when the water surface in FIG. 7 rises from a position corresponding to the second portion 272 to a position corresponding to the first portion 271 due to a wave, the volume of the float 27 provided under the water surface significantly increases in a short time, and the buoyancy that the float 27 receives from seawater significantly increases in a short time (namely, increases in a stepwise manner). On the other hand, for example, when the water surface in FIG. 7 descends from the position corresponding to the first portion 271 to the position corresponding to the second portion 272 due to a wave, the volume of the float 27 provided under the water surface significantly decreases in a short time, and the buoyancy that the float 27 receives from seawater significantly decreases in a short time (namely, decreases in a stepwise manner). The float 27 can be appropriately moved up and down using such a significant increase and decrease in buoyancy, and the circulation fluid F can be reliably supplied from the feeding device 24 to the upper storage tank 21.

(Circulation)

Next, a circulation of the circulation fluid F in the power generation device 100 will be described. FIGS. 9 to 13 are views illustrating a circulation of the circulation fluid F.

First, as illustrated in FIG. 9, when a wave hits the front side (+X direction) of the housing 1, the wave is taken into the hollow portion 10 of the housing 1 through the front side opening portion 16, and the water surface inside the housing 1 rises as illustrated in FIG. 10. For example, the water surface rises in a comparatively short time to the vicinity of the first portion 271 (FIG. 7) of the float 27, the buoyancy received by the float 27 from seawater increases, and the float 27 moves upward (+Z direction) due to the buoyancy.

In this case, the float 27 approaches the storage tank-side accommodation portion 2, and since the duct tube 242 of the feeding device 24 in FIG. 7 is fixed to the storage tank-side accommodation portion 2, the distance between the bottom of the float 27 and the duct tube 242 in the height direction (Z-axis direction) is reduced, and the bellows tube 241 is pushed by the float 27 to contract. Then, the volume of the bellows tube 241 decreases, the circulation fluid F in the bellows tube 241 is pushed out to a duct tube 242 side, and as illustrated in FIG. 11, the circulation fluid F is pushed out and supplied from the feeding device 24 to the upper storage tank 21 through the first pipe 251.

Then, the circulation fluid F stored in the upper storage tank 21 descends due to the own weight of the circulation fluid F, and is supplied to the lower storage tank 22 through the third pipe 253.

Thereafter, some of seawater in the hollow portion 10 of the housing 1 in FIG. 11 is drained to the outside of the housing 1 through the front side opening portion 16, and as illustrated in FIG. 12, the water surface inside the housing 1 descends. For example, the water surface descends to the vicinity of the second portion 272 (FIG. 7) of the float 27 in a comparatively short time, the buoyancy that the float 27 receives from seawater decreases, and as illustrated in FIG. 13, the float 27 moves to the lower side (−Z direction) due to its own weight.

In this case, the float 27 moves away from the storage tank-side accommodation portion 2, and since the duct tube 242 of the feeding device 24 in FIG. 7 is fixed to the storage tank-side accommodation portion 2 side, the distance between the bottom of the float 27 and the duct tube 242 in the height direction (Z-axis direction) is increased, and since the lower end portion of the bellows tube 241 is fixed to the bottom of the float 27, the bellows tube 241 is pulled by the float 27 to expand. Then, since the volume of the bellows tube 241 increases and the circulation fluid F in the duct tube 242 is taken into the bellows tube 241, the circulation fluid F is drawn and supplied from the lower storage tank 22 to the feeding device 24 through the second pipes 252.

In such a manner, the circulation fluid F can be raised to the upper storage tank 21 by the up-down movement of the float 27 based on the wave force, and can be circulated.

(Generation of Electricity)

Next, the generation of electricity in the power generation device 100 will be described. The power generation unit 23 generates electricity using the circulation fluid F supplied to flow from the upper storage tank 21 in FIG. 7 to the lower storage tank 22 through the third pipe 253. In particular, since the circulation fluid F is stored in the upper storage tank 21 by the wave force even while the power generation unit 23 generates electricity, for example, a state where the circulation fluid F is stored in the upper storage tank 21 can be maintained, and the power generation unit 23 can constantly generate power, so that the amount of electricity generated can be improved. In addition, by raising the circulation fluid F to the upper storage tank 21 using the wave force, the need for electric power for operating a device that raises the circulation fluid F is eliminated, and the cost (expense) of the electric power can be omitted, so that electricity can be generated at low cost. A method for using the generated electric power is optional, and for example, the generated electric power may be used by connecting an electric wire for distribution to the power generation device 100 and distributing the generated electric power via the electric wire.

(High Wave)

Next, a case where the power generation device 100 receives a high wave due to the influence of typhoon or the like will be described.

For example, in the power generation device 100 illustrated in FIG. 1, when a high wave (for example, a wave of a predetermined wave height or more, as one example, a wave of a wave height of 2 m to 3 m or more or the like) surges from the front side (+X direction), the high wave rises up the housing-side front portion 11, or the wave rises on the outer flow paths 14 via the front side inclined portion 15. In this case, a part or the entirety of the housing 1 of the power generation device 100 is temporarily submerged in the sea (namely, sunk in the sea) by the rising wave (in detail, the force of the wave, the weight of seawater due to the wave, or the like). As a result, since a part or the entirety of the housing 1 can avoid (or reduce) the wave force received from the high wave in the sea, the wave force that the housing 1 receives from the high wave decreases, and the swing of the housing 1 is suppressed. It should be noted that, here, the power generation device 100 floats up after sinking for a certain time.

It should be noted that in this case, as illustrated in FIG. 1, since the width of the front side opening portion 16 in the height direction (Z-axis direction) is determined to be a predetermined width, a wave of a wave height suitable for circulating the circulation fluid F is taken into the hollow portion 10 of the housing 1, so that the circulation of the circulation fluid F is appropriately continued.

In addition, for example, in the power generation device 100 illustrated in FIG. 1, when a high wave surges from the side surface sides (+Y direction and −Y direction), the high wave rises up the housing-side side portions 12, or the wave passes over the flow path side wall portions 141 and rises on the outer flow paths 14. In this case, similarly to the above-described case, the swing of the housing 1 is suppressed.

(Strong Wind)

Next, a case where the power generation device 100 receives strong wind due to the influence of typhoon or the like will be described.

For example, the housing 1 of the power generation device 100 in FIG. 6 may swing due to the influence of strong wind, and in this case, since the storage tank-side accommodation portion 2 is suspended via the suspension portion 20, the degree of swing of the storage tank-side accommodation portion 2 is reduced, and the degree of swing of the upper storage tank 21, the lower storage tank 22, and the like accommodated in the storage tank-side accommodation portion 2 is reduced.

(Advantageous Effects of the Present Embodiment)

According to the present embodiment, for example, electricity can be generated at low cost by feeding the circulation fluid F toward the upper storage tank 21 at the predetermined height position based on the wave force received by the float 27 and by generating electricity using the potential energy of the circulation fluid F raised to the upper storage tank 21 at the predetermined height position.

In addition, since the lower portion of the float 27 protrudes such that the cross-sectional area in the horizontal direction decreases as the float 27 extends downward, for example, when the position of the water surface with respect to the float 27 changes upon receiving a wave, the buoyancy can be increased or decreased in a stepwise manner, and the circulation fluid F can be reliably raised to the predetermined height position, so that electricity can be appropriately generated.

In addition, since the circulation fluid F can be appropriately raised to the predetermined height position, for example, by configuring the upper end portion 251A of the first pipe 251 so as to reduce frictional resistance between the circulation fluid F supplied to the predetermined height position and the first pipe 251, and to suppress foaming of the circulation fluid F when the circulation fluid F is supplied to the predetermined height position, electricity can be appropriately generated.

In addition, for example, electricity can be appropriately generated by generating electricity using the circulation fluid F supplied from the upper storage tank 21 to the lower storage tank 22.

In addition, since the circulation fluid F can be reliably taken into a feeding device 24 side, for example, by setting the total flow path diameter of the second pipes 252 to be larger than the total flow path diameter of the first pipe 251, the circulation fluid F can be reliably raised to the predetermined height position, and electricity can be appropriately generated.

In addition, since the circulation fluid F can be reliably raised to the predetermined height position, for example, by feeding the circulation fluid F based on an increase or decrease in the volume of the bellows tube 241, electricity can be appropriately generated.

In addition, since the circulation fluid F is a fluid formed of mixed water containing a chain polymer, for example, the circulation fluid F can be efficiently raised to the predetermined height position, so that the electricity generation efficiency can be improved.

In addition, for example, by providing the suppressing member (the housing-side front portion 11, the housing-side side portions 12, the outer flow paths 14, and the front side inclined portion 15), the swing of the housing 1 due to a high wave can be suppressed, thereby appropriately generating electricity.

In addition, when the front side inclined portion 15 receives a high wave, the wave can be guided onto the outer flow paths 14, for example, by guiding the wave to the outer flow paths 14, so that at least a part of the housing 1 can be reliably submerged in the water, and the swing of the housing 1 due to the high wave can be suppressed, thereby appropriately generating electricity.

In addition, since the magnitude of swing of the housing 1 due to a high wave can be prevented from being directly transmitted to the storage tank-side accommodation portion 2, for example, by suspending the storage tank-side accommodation portion 2 from the housing 1 inside the housing 1, the magnitude of the swing of the storage tank-side accommodation portion 2 can be reduced.

In addition, since the internal front side inclined portion 17 is provided, for example, the water depth inside the housing 1 becomes shallower as the distance from the front side opening portion 16 increases, so that the wave height inside the housing 1 can be increased, and the wave force can be increased, thereby appropriately generating electricity.

In addition, since the amount of reflection of a wave inside the housing 1 can be suppressed, for example, by providing the internal side inclined portions 18, the usage efficiency of the wave can be improved, and the electricity generation efficiency can be improved.

[III] Modification to Embodiment

The embodiment according to the invention has been described above; however, the specific configurations, members, paths, unit, and device of the invention can be optionally modified and improved within the scope of each technical concept of the invention stated in the claims.

Regarding Problems to be Solved and
Advantageous Effects of the Invention

First, the problems to be solved by the invention and the effects of the invention are not limited to the contents described above, and may differ depending on the details of the implementation environment or the configurations of the invention, and only some of the above-described problems may be solved or only some of the above-described effects may be achieved. In addition, problems derived from the items stated in the present application other than the explicitly stated problems may be interpreted as problems of the present application.

(Regarding Distribution and Integration)

In addition, the configurations described above are functional concepts, and do not necessarily need to be physically configured as illustrated. Namely, the specific forms of the distribution and integration of the parts are not limited to those illustrated, and all or some of the parts can be functionally or physically distributed or integrated in any units.

(Regarding Drainage Adjustment Member)

FIGS. 14 and 15 are cross-sectional views illustrating the inside of the power generation device. A drainage adjustment member may be provided for the power generation device 100 of the embodiment. The "drainage adjustment member" is a member that adjusts a drainage time related to a wave taken into the system-side accommodation member, and is a member provided inside the system-side accommodation member.

For example, as illustrated in FIG. 14, a drainage adjustment portion 31 and an installation base 32 may be provided on the internal bottom portion 19.

The drainage adjustment portion 31 is a drainage adjustment member, and can be configured using, for example, a rectangular elastic rubber plate. The width of the drainage adjustment portion 31 is optional, and may be set to, for example, a width slightly shorter than a distance between the inner wall portions 18A on both sides in the left-right direction (Y-axis direction) of FIG. 8, may be set to the same width as the width of the internal front side inclined portion 17, or may be set to a width narrower than the width of the internal front side inclined portion 17.

For example, the drainage adjustment portion 31 in FIG. 14 is fixed to the installation base 32 at an end portion on the front side (+X direction) thereof, and as illustrated in FIG. 14, is biased to be disposed along an upper surface of the installation base 32. Namely, the drainage adjustment portion 31 is biased such that an end portion (hereinafter, a "non-fixed-side end portion") on an opposite side of the drainage adjustment portion 31 from a side fixed to the installation base 32 faces the back side (−X direction).

The installation base 32 in FIG. 14 is a base on which the drainage adjustment portion 31 is to be installed.

When a wave hits the housing 1 and the amount of seawater in the hollow portion 10 increases, and then the seawater in the hollow portion 10 is drained through the front side opening portion 16, as illustrated in FIG. 15, the seawater flows from the back side (−X direction) toward the front side (+X direction), but the flow of the seawater lifts up the drainage adjustment portion 31 such that the "non-fixed-side end portion" faces the upper side (+Z direction). Then, since the drainage of the seawater in the hollow portion 10 (in detail, the seawater located on the back side (−X direction) with respect to the drainage adjustment portion 31) is delayed by the drainage adjustment portion 31 that is lifted up, the time for the float 27 in FIG. 7 to move to the lower side (−Z direction) can be delayed, and the circulation fluid F can be reliably supplied from the feeding device 24 to the upper storage tank 21 side.

With such a configuration, since seawater can be retained inside the housing 1 for a time sufficient for sufficiently feeding the circulation fluid F toward the predetermined height position, for example, by providing the drainage adjustment portion 31, the circulation fluid F can be appropriately raised to the predetermined height position, and electricity can be appropriately generated.

(Regarding Buffer Material) FIG. 16 is a cross-sectional view illustrating the inside of the power generation device. A buffer material 33 may be provided for the power generation device 100 of the embodiment. The buffer material 33 is a member that reduces an impact on the float 27. By providing the buffer material 33 on the lower side (−Z direction) of the float 27, the float 27 can be prevented from directly hitting the internal bottom portion 19 when the float 27 significantly moves to the lower side (−Z direction).

(Regarding Float) FIG. 17 is a cross-sectional view illustrating the inside of the power generation device, and FIG. 18 is a view illustrating various shapes of floats. A float 2711 in FIG. 18 may be used instead of the float 27 of the power generation device 100 of the embodiment. The float 2711 is, unless otherwise specified, the same as the float 27. As illustrated in FIG. 17, a front portion 2711A of the float 2711 (namely, a part of the front side of the float 2711) is inclined toward a front side opening portion 16 side. With such a configuration, regarding a wave taken in from the front side opening portion 16, the amount of reflection at the front portion 2711A can be suppressed, so that the float 2711 can be appropriately moved up and down.

With such a configuration, the front portion 2711A that is a part on the front side opening portion 16 side of the float 2711 is inclined toward the front side opening portion 16 side, so that for example, the amount of reflection of a wave by the float 2711 can be suppressed. Therefore, the usage efficiency of the wave can be improved, and the electricity generation efficiency can be improved.

It should be noted that as illustrated in FIG. 17, the front portion 2711A of the float 2711 may have a linear shape extending straight or a curved shape in a side view. It should be noted that in the case of a curved shape, in particular, the front portion 2711A may be configured to face the upper side (+Z direction) as the front portion 2711A extends from the float 2711 toward the front side opening portion 16 side.

In addition, as the shape of the float 27 of the embodiment, the shapes illustrated in FIG. 18(*a*) to 18(*d*) or other shapes may be adopted. It should be noted that each drawing illustrates the outer shape of the float when viewed from the front side (namely, the front side opening portion 16 side).

(Regarding Feeding Device) FIG. 19 is a view illustrating a feeding device. FIG. 19(*a*) is a side view of a feeding device 24A, in which each check valve inside a duct tube 242A is illustrated for convenience, and FIG. 19(*b*) is a rear view. In the power generation device 100 of the embodiment, the feeding device 24A may be used instead of the feeding device 24. In the feeding device 24A, a plurality of bellows tubes 241A are provided for one duct tube 242A.

(Another Power Generation Device) FIG. 20 is a cross-sectional view illustrating the inside of another power generation device, FIG. 21 is a view illustrating an auxiliary feeding device, and FIGS. 22 and 23 are views illustrating a circulation of the circulation fluid. The elements of the power generation device 100 of the embodiment illustrated in FIG. 7 may be replaced with elements in FIG. 20 to constitute another power generation device. It should be noted that it is assumed that the other power generation device is, unless otherwise specified, configured similarly to the power generation device 100. Schematically, the other power generation device is configured to supply the circulation fluid F from a feeding device to an upper storage tank 41 both when a float 48 moves to the upper side (+Z direction) and when the float 48 moves to the lower side (−Z direction).

The other power generation device includes a storage tank-side accommodation portion 4, the upper storage tank 41, a lower storage tank 42, a power generation unit 43, a main feeding device 44, auxiliary feeding devices 45, a main first pipe 461A (first supply flow path), auxiliary first pipes 461B (first supply flow path), a main second pipe 462A (second supply flow path), auxiliary second pipes 462B (second supply flow path), a third pipe 463, and check valves 47 in FIG. 20. It should be noted that a total of two sets of the auxiliary feeding devices 45 are provided on both sides of the main feeding device 44, but only one of the sets is denoted by reference signs and will be described.

(Regarding Other Power Generation Device—Storage Tank-Side Accommodation Portion, Each Storage Tank, Power Generation Unit, and Third Pipe)

The storage tank-side accommodation portion 4, the upper storage tank 41, the lower storage tank 42, the power generation unit 43, the third pipe 463, and the float 48 in FIG. 20 have the same configurations as those with the same names in the embodiment.

(Regarding Other Power Generation Device—Main Feeding Device)

The main feeding device 44 in FIG. 20 is a feeding device that feeds the circulation fluid F toward the predetermined height position based on the wave force received by the float 48, and is a feeding device accommodated in a hollow portion of the float 48. The main feeding device 44 is, for example, a first feeding device that feeds the circulation fluid F to the predetermined height position when the float 48 moves upward based on the wave force received by the float 48.

The main feeding device 44 includes, for example, a bellows tube 441 and a duct tube 442, and is configured similarly to the feeding device 24 of the embodiment.

(Regarding Other Power Generation Device—Auxiliary Feeding Device)

The auxiliary feeding device 45 in FIG. 20 is a feeding device that feeds the circulation fluid F toward the predetermined height position based on the wave force received by the float 48, and is a feeding device accommodated in the hollow portion of the float 48. The auxiliary feeding device 45 is, for example, a second feeding device that feeds the circulation fluid F to the predetermined height position when the float 48 moves downward based on a wave force received by the float 48. For example, the auxiliary feeding device 45 is a device which supplies the circulation fluid F to the upper storage tank 41 by raising the circulation fluid F through the auxiliary first pipe 461B, and to which the circulation fluid F is supplied through the auxiliary second pipe 462B. The auxiliary feeding device 45 includes, for example, a bellows tube 451 and a connection member 452.

(Regarding Other Power Generation Device—Auxiliary Feeding Device—Bellows Tube) The bellows tube 451 in FIG. 20 is a bellows tube in which the circulation fluid is stored, and is a bellows tube of which the volume (namely, the volume of a hollow portion of the bellows tube 451) increases or decreases according to the up-down movement of the float 48 based on the wave force.

An upper end portion (+Z direction) of the bellows tube 451 is fixed to an upper portion 452A of the connection member 452 in FIG. 21, and a lower end portion (−Z direction) of the bellows tube 451 is connected and fixed to a communication portion 460 in FIG. 21.

The communication portion 460 is a portion communicating with the inside (namely, the hollow portion) of the bellows tube 451, the auxiliary first pipe 461B, and the auxiliary second pipe 462B, and is a portion fixed to a storage tank-side accommodation portion 4 side. Namely, the circulation fluid F is movable between the inside of the bellows tube 451, the auxiliary first pipe 461B, and the auxiliary second pipe 462B via the communication portion 460. It should be noted that the communication portion 460 may be interpreted as an element of the auxiliary feeding device 45.

(Regarding Other Power Generation Device—Auxiliary Feeding Device—Connection Member) The connection member 452 in FIG. 20 is a member connecting the upper end portion (+Z direction) of the bellows tube 451 to the float 48, and as illustrated in FIG. 21(b), is an L-shaped member. A lower end portion (−Z direction) of the connection member 452 is fixed to a bottom of the float 48. Since the bellows tube 451 is connected to the bottom of the float 48 via the connection member 452, when the float 48 moves to the upper side (+Z direction), the bellows tube 451 is pulled by the upper portion 452A of the connection member 452 to expand, and the volume of the bellows tube 451 increases. On the other hand, when the float 48 moves to the lower side (−Z direction), the bellows tube 451 contracts by being pushed by the upper portion 452A of the connection member 452, and the volume of the bellows tube 451 increases.

(Regarding Other Power Generation Device—First Pipe) The main first pipe 461A in FIG. 20 is configured similarly to the first pipe 251 in FIG. 7. The auxiliary first pipe 461B in FIG. 20 is a first supply flow path that supplies the circulation fluid F fed by the auxiliary feeding device 45 to the predetermined height position, and for example, is fixedly provided on the storage tank-side accommodation portion 4 side. A lower end portion of the auxiliary first pipe 461B is connected to the bellows tube 451 of the auxiliary feeding device 45 via the communication portion 460, and an upper end portion of the auxiliary first pipe 461B is provided on a lower storage tank 42 side.

(Regarding Other Power Generation Device—Second Pipe) The main second pipe 462A in FIG. 20 is configured similarly to the second pipe 252 in FIG. 7. The auxiliary second pipe 462B in FIG. 20 is a second supply flow path that returns the circulation fluid F at the predetermined height position to the auxiliary feeding device 45, and specifically, is a flow path that returns the circulation fluid F in the upper storage tank 41 to the auxiliary feeding device 45 via the lower storage tank 42. A lower end portion of the auxiliary second pipe 462B is connected to the bellows tube 451 of the auxiliary feeding device 45 via the communication portion 460, and an upper end portion of the auxiliary second pipe 462B is connected to a bottom of the lower storage tank 42. For example, a flow path diameter of the auxiliary second pipe 462B may be configured to be larger than a flow path diameter of the auxiliary first pipe 461B.

(Configuration—Check Valve)

The check valves 47 in FIG. 20 allow the circulation fluid F to flow in directions indicated by arrows in FIG. 20 (a direction from the lower storage tank 42 toward the auxiliary feeding device 45 and a direction from the auxiliary feeding device 45 toward the upper storage tank 41), and prevent a backflow.

(Circulation)

Next, a circulation of the circulation fluid F in the other power generation device will be described.

First, when the float 48 moves to the upper side (+Z direction) as illustrated in FIG. 22, similarly to the case described in the embodiment, the circulation fluid F is supplied from the main feeding device 44 to the upper storage tank 41 through the main first pipe 461A. Then, the circulation fluid F stored in the upper storage tank 41 is supplied to the lower storage tank 42 through the third pipe 463 due to the own weight of the circulation fluid F. It should be noted that the power generation unit 43 generates electricity using the energy of the circulation fluid F.

In this case, the float 48 approaches the storage tank-side accommodation portion 4, the distance between the upper portion 452A of the connection member 452 and the communication portion 460 in FIG. 21 in the height direction (Z-axis direction) is increased, and the bellows tube 451 is pulled by the upper portion 452A of the connection member 452 to expand. Then, since the volume of the bellows tube 451 increases and the circulation fluid F in the communication portion 460 is taken into the bellows tube 451, the circulation fluid F is supplied from the lower storage tank 42 to the auxiliary feeding device 45 through the auxiliary second pipe 462B.

Next, when the float 48 moves to the lower side (-Z direction) as illustrated in FIG. 23, similarly to the case described in the embodiment, the annular fluid F is supplied from the lower storage tank 42 to the main feeding device 44 through the main second pipe 462A.

In this case, the float 48 moves away from the storage tank-side accommodation portion 4, the distance between the upper portion 452A of the connection member 452 and the communication portion 460 in FIG. 21 in the height direction (Z-axis direction) is reduced, and the bellows tube 451 is pushed by the upper portion 452A of the connection member 452 to contract. Then, the volume of the bellows tube 451 decreases, the circulation fluid F in the bellows tube 451 is pushed out to a communication portion 460 side, and the circulation fluid F is supplied from the auxiliary feeding device 45 to the upper storage tank 41 through the auxiliary first pipe 461B.

With such a configuration, for example, by providing the main feeding device 44 and the auxiliary feeding devices 45, the circulation fluid F can be fed to the predetermined height position both when the float 48 moves upward and when the float 48 moves downward, so that the usage efficiency of a wave can be improved, and the electricity generation efficiency can be improved.

(Regarding Seawater Storage Portion)

FIGS. 24 to 27 are cross-sectional views illustrating the inside of a power generation device. A housing 511 in FIG. 24 may be used instead of the housing 1 of the power generation device 100 of the embodiment. The housing 511 includes a front side opening portion 512, a seawater storage portion 513, a drainage opening portion 514, and an internal front side inclined portion 515.

The front side opening portion 512 has the same configuration as that with the same name in the embodiment. The seawater storage portion 513 is a portion that stores seawater inside the housing 511. The drainage opening portion 514 includes a plurality of opening portions for draining at least some of the seawater stored in the seawater storage portion 513 to the outside of the housing 511. The internal front side inclined portion 515 is a first inner inclined portion extending from the front side opening portion 512 toward the float 27 inside the housing 511, and is a first inner inclined portion inclined to be located upward (+Z direction) as the first inner inclined portion extends away from the front side opening portion 512.

First, as illustrated in FIG. 25, when a wave hits the front side (+X direction) of the housing 511, the wave is taken into a hollow portion of the housing 511 through the front side opening portion 512, and the water surface inside the housing 511 rises. In this case, as illustrated in FIG. 26, the float 27 moves to the upper side (+Z direction) due to buoyancy.

Thereafter, some of the seawater in the seawater storage portion 513 is drained through the drainage opening portion 514, and as illustrated in FIG. 27, the water surface inside the housing 511 descends. In this case, the float 27 moves to the lower side (-Z direction) due to its own weight.

(Regarding Maintaining Member)

FIG. 28 is a cross-sectional view illustrating the inside of a power generation device. A maintaining member may be provided for the power generation device 100 of the embodiment. The "maintaining member" is a member that maintains the storage amount of the fluid in the upper storage member within a predetermined range.

For example, as illustrated in FIG. 28, a first maintaining portion 521 and a second maintaining portion 522 may be provided.

The first maintaining portion 521 is a maintaining member, specifically, a first maintaining portion that maintains the amount of the circulation fluid F in the upper storage tank 21 at a lower limit storage amount or more. For example, when the amount of the circulation fluid F reaches the lower limit storage amount, the first maintaining portion 521 closes an end portion on the upper storage tank 21 side of the third pipe 253. The configuration of the first maintaining portion 521 is optional, and may include, for example, a float 521A, a plug 521B, and a weight 521C.

Since the inside of the third pipe 253 can be constantly filled with the circulation fluid F by providing the first maintaining portion 521 in such a manner, air can be prevented from being supplied to the power generation unit 23 and causing a malfunction of the power generation unit 23.

The second maintaining portion 522 is a maintaining member, specifically, a second maintaining portion that maintains the amount of the circulation fluid F in the upper storage tank 21 at an upper limit storage amount or less. For example, when the amount of the circulation fluid F exceeds the upper limit storage amount, the second maintaining portion 522 supplies the circulation fluid F in excess of the upper limit storage amount in the upper storage tank 21 to the lower storage tank 22. The configuration of the second maintaining portion 522 is optional, and may be configured using, for example, a pipe or the like of which an upper end portion (+Z direction) and a lower end portion (-Z direction) are open. It should be noted that FIG. 28 illustrates a case where a lower end portion (-Z direction) of the second maintaining portion 522 is provided underwater in the circulation fluid F in the lower storage tank 22, but the lower end portion may be provided on the upper side (+Z direction) with respect to the water surface.

With such a configuration, the power generation system can be appropriately operated, for example, by maintaining the storage amount of the circulation fluid F at a storage amount within the predetermined range.

(Regarding Guide Member)

FIG. 29 is a side view of a power generation device. A guide member may be provided for the power generation device 100 of the embodiment. The "guide member" is a member that guides the system-side accommodation member to the front side of the system-side accommodation member when the system-side accommodation member floats up after submerging.

For example, as illustrated in FIG. 29(*a*), a total of six floats 531 may be provided, specifically, three floats 531 may be provided on each of both side surfaces (the +Y direction and the -Y direction) of the housing 1 in FIG. 1. The float 531 is a guide member, and has, for example, an elliptical shape in a side view, and is inclined such that long sides of the ellipse are aligned with an oblique direction.

When a high wave surges toward the front side (+X direction) of the housing 1, as described in the embodiment, the housing 1 submerges under the sea surface. In this case, it is assumed that the housing 1 moves toward the back side (−X direction) in the sea based on the wave force of the high wave. In such a case, since the floats 531 are provided in a state where the floats 531 are obliquely directed, when the housing 1 floats up from the sea, the housing 1 is guided (namely, moved) to the front side (+Z direction), so that the power generation device can be prevented from being swept away by the high wave.

In addition, for example, instead of the floats 531 in FIG. 29(a), fins 532 or 533 (guide members) illustrated in FIG. 29(b) or 29(c) may be provided for the housing 1, or the guide members illustrated in the drawings may be optionally combined and provided. It should be noted that the number and installation positions of the guide members provided on the housing 1 may be optionally changed.

(Regarding Plurality of Sets of Feeding Devices and the Like)

FIG. 30 is a cross-sectional view illustrating a part of the inside of a power generation device. Instead of the housing 1 of the power generation device 100 of the embodiment, a housing 1A having a comparatively large size in FIG. 30 may be used, and a plurality of sets (for example, three sets or the like) of the elements in FIG. 7 may be provided for the housing 1A.

(Regarding Intake Plate)

FIG. 31 is a perspective view of a housing, and FIG. 32 is a plan view illustrating the inside of the housing. A housing 541 in FIG. 31 may be used instead of the housing 1 of the power generation device 100 of the embodiment.

For example, as illustrated in FIG. 32, the front side (+X direction) of the housing 541 has an arc shape in a plan view, and as one example, includes a front side opening portion 542 and an intake plate 543.

The front side opening portion 542 has the same configuration as that with the same name in the embodiment. The intake plate 543 in FIGS. 31 and 32 is an intake plate provided in the front side opening portion 542, and is a plate member that takes waves into the inside of the housing 541 upon being hit by the waves. The intake plate 543 is provided, for example, along the X-axis direction in the vicinity of the center of the front side opening portion 542 with respect to the left-right direction (Y-axis direction). A length of the intake plate 543 in the height direction (Z-axis direction) may be set to be the same as or slightly shorter than a length of the front side opening portion 542 in the height direction.

With such a configuration, for example, when waves surge in directions indicated by arrows A11 to A13 in FIG. 32, more waves can be taken into the inside of the housing 541. Specifically, in a case where the intake plate 543 is not present, waves between the arrow A11 and the arrow A12 (namely, waves supplied between end portions 544 on both sides of the front side opening portion 542 in the left-right direction (Y-axis direction)) can be taken in. On the other hand, in a case where the intake plate 543 is provided, waves between the arrow A11 and the arrow A13 (namely, waves supplied between the end portion 544 on one side of the front side opening portion 542 in the left-right direction (Y-axis direction) and the intake plate 543), namely, as many waves as there are between the arrow A12 and the arrow A13 can be taken in.

With such a configuration, since waves can be sufficiently taken into the inside of the housing 541, for example, by providing the intake plate 543 that takes waves into the inside of the housing 541 upon being hit by the waves, electricity can be appropriately generated.

(Regarding Housing)

FIGS. 33 and 34 are cross-sectional views illustrating the inside of a power generation device, FIG. 35 is a view of a housing, and FIGS. 36 to 39 are perspective views of the housing. The housing in each drawing may be used instead of the housing 1 of the power generation device 100 of the embodiment. Regarding each housing, it is assumed that only feature portions will be described below, and portions of which description is omitted are configured similarly to the housing 1.

A housing 551 in FIG. 33 includes a protruding portion 552. The protruding portion 552 is a portion that accommodates the elements in FIG. 7, and for example, is a portion protruding toward the upper side (+Z direction).

A housing 561 in FIG. 34 is a housing having a vibration control structure that absorbs swing of the housing 561 caused by waves. Specifically, by configuring a protruding portion 562 of the housing 561 such that a plurality of portions divided in the height direction (Z-axis direction) are stacked on each other, the stacked portions are configured to swing independently of each other in the horizontal direction. In FIG. 34, a connection portion 563 is a boundary between the portions, and portions above and below the boundary are configured to swing independently of each other in the horizontal direction. Then, each portion is connected using a vibration damper for absorbing each swing of each portion. In such a manner, the vibration control structure may be achieved. It should be noted that the vibration control structure of the housing 561 may be achieved using any technique used for vibration control structures of buildings. Namely, the vibration control structure may be achieved by providing a vibration control device on the housing 561 instead of the stacked structure. It should be noted that, as described above, in the case of the stacked structure, after omitting the storage tank-side accommodation portion 2 in FIG. 7, the upper storage tank 21 (refer to FIG. 7) may be fixed to one of the plurality of divided portions of the protruding portion 562 in FIG. 34, and the lower storage tank 22 (refer to FIG. 7) may be fixed to another one of the plurality of divided portions of the protruding portion 562 (namely, a portion other than the portion to which the upper storage tank 21 is fixed).

Housings 571 and 572 in FIGS. 35(a) and 35(b) are housings that adopt a shape corresponding to the shape of a bottom of a general ship, and a housing 573 in FIG. 35(c) is a housing that adopts a shape corresponding to a so-called streamlined shape.

Housings 574 and 575 in FIGS. 36 and 37 are housings that adopt main bodies having a comparatively low height and protruding portions 574A and 575A protruding from the main bodies. It should be noted that the protruding portions 574A and 575A are portions that accommodate the elements in FIG. 7.

A housing 576 in FIG. 38 is a housing formed by providing wall portions 576A in FIG. 38 on the housing 574 in FIG. 36. The wall portions 576A are, for example, members that form a flow path of seawater that rises up an upper surface (+Z direction) of a main body (portion on which the wall portions 576A are provided) of the housing 576 due to a high wave. Since the wall portions 576A are provided in such a manner, a high wave rises up the flow path, and the housing 576 sinks in the sea, so that the swing of the housing 576 due to the high wave can be suppressed.

A housing 577 in FIG. 39 is a housing formed by providing a cavity 577Z in FIG. 39 in the vicinity of the center of the protruding portion 574A with respect to the height direction (Z-axis direction) on the housing 574 in FIG. 36, and by dividing the protruding portion 574A into a first portion 577A and a second portion 577B with the cavity 577Z interposed therebetween. The first portion 577A is a portion that accommodates the upper storage tank 21 in FIG. 7. The second portion 577B is a portion that accommodates the lower storage tank 22 and the like in FIG. 7. Then, the first portion 577A may be supported using a plurality of pillar members 577C. Then, as illustrated in FIG. 39, the first pipe 251 and the second pipe 252 may be exposed. With such a configuration, when strong wind blows against the housing 577, some of the strong wind blows through the cavity 577Z, so that the swing of the housing 577 due to the strong wind can be reduced.

(Regarding Retention Member)

FIG. 40 is a side view of the housing in a floated state. It should be noted that in FIG. 40, the detailed shape (elements related to the outer flow paths 14 and the like) of the housing 1 is not illustrated (the same applies to FIGS. 41 to 44 to be described later). A retention member may be provided for the housing 1 of the power generation device 100 of the embodiment. The "retention member" is a member that retains the system-side accommodation member at a predetermined position.

For example, retention portions 611 in FIG. 40(*a*) may be provided for the housing 1. The retention portions 611 are retention members, and for example, are suspended from the housing 1 using any wire-shaped body such as a rope or a chain. The retention portions 611 can be configured using a flat plate member or the like with a shape having a certain extent (for example, a circular shape having a diameter of approximately 3 m to 5 m or the like). Since resistance due to seawater during the movement of the housing 1 is increased by the retention portions 611, so that the housing 1 can be retained.

It should be noted that the installation positions of the retention portions 611 are optional, and for example, as illustrated in FIG. 40(*a*), the retention portions 611 may be provided at positions not reaching the seabed, or may be placed and provided on the seabed.

For example, retention portions 612 and 613 in FIG. 40(*b*) may be provided for the housing 1. The retention portions 612 are retention members, and for example, are basically the same as the retention portions 611 described above, but are partially different in shape. The retention portion 613 is a retention member, and is, for example, a weight. It should be noted that the retention portions 611 to 613 in the drawings may be optionally combined and provided for the housing 1, or the number of the retention portions that are provided may be optionally changed. It should be noted that since the retention portions 611 to 613 become resistances when the housing 1 moves, the retention portions 611 to 613 also exhibit a function of preventing swing of the housing 1.

(Regarding Suppressing Floating Body)

FIGS. 41 to 43 are side views of the housing and the like in a floated state. A suppressing floating body may be used by being coupled to the housing 1 of the power generation device 100 of the embodiment. The "suppressing floating body" is used to suppress swing of the system-side accommodation member caused by waves, and the suppressing floating body floats at a position away from the system-side accommodation member, and for example, is coupled to the system-side accommodation member above or under the water.

For example, a floating object 622 in FIG. 41 may be used. The floating object 622 is a suppressing floating body, for example, any floating object floating on the sea surface, and for example, a floating object having a smaller size than the housing 1 and having an outer shape similar to that of the housing 1 (it should be noted that it is assumed that a front side opening portion is not provided) or a floating object having another shape may be used.

Then, the floating object 622 and the housing 1 are coupled to each other using a coupling member 623 provided in the sea. It should be noted that it is preferable that as the coupling member 623, for example, a member having comparatively high rigidity, such as a wood or metal member, is used from the viewpoint of forming floating objects including the floating object 622, the housing 1, and the coupling member 623 as one unit. It should be noted that from the viewpoint of suppressing swing caused by a wave, it is preferable that a total length from the floating object 622 to the housing 1 is configured to be equal to or more than a half (for example, approximately 30 m) of the wavelength (for example, approximately 60 m) of the wave.

In the case of such a configuration, since the floating object 622, the housing 1, and the coupling member 623 float as one unit, the swing of the housing 1 due to a wave can be suppressed. In addition, since the coupling member 623 is provided in the sea, the coupling member 623 is difficult to see from a side above the sea, and the scenery can be maintained.

It should be noted that the floating object 622 and the coupling member 623 may also be interpreted as configurations of the power generation device 100 (namely, elements of the power generation system) of the embodiment (the same applies to a retention portion 621, a floating object 631, and a coupling member 632 to be described later).

In addition, the retention portion 621 may be optionally provided for the housing 1 in FIG. 1. The retention portion 621 is the retention member described above, and is, for example, a weight placed on the seabed. For example, the retention portion 621 may be fixed to the housing 1 using any wire-shaped body 624 such as a rope or a chain.

The retention portion 621 may be connected and fixed to the floating object 622. Alternatively, as illustrated in FIG. 42, the retention portion 621 may be connected to and fixed to both the housing 1 and the floating object 622. For example, a comparatively long wire-shaped body may be used as the wire-shaped body 624. The wire-shaped body 624 may be passed through a connection portion 621A having a ring shape and provided on the retention portion 621, and both ends of the wire-shaped body 624 may be connected and fixed to the housing 1 and the floating object 622. It should be noted that it is assumed that the wire-shaped body 624 is inserted into a hole of the ring of the connection portion 621A, and is movable toward a housing 1 side or a floating object 622 side.

With such a configuration, for example, when the housing 1 is lifted to a comparatively high position by a high wave, the floating object 622 is pulled via the wire-shaped body 624, so that the housing 1 and the floating object 622 swing in synchronization with each other. Therefore, swing can be cancelled out, and the degree of the swing can be suppressed.

For example, the floating object 631 in FIG. 43 may be used. The floating object 631 is a suppressing floating body, and has, for example, the same configuration as the floating object 622 in FIG. 41.

The floating object 631 and the housing 1 are coupled to each other using the coupling member 632 provided above the sea. It should be noted that the coupling member 632 has, for example, the same configuration as the coupling member 623 in FIG. 41.

In the case of such a configuration, since the floating object 631, the housing 1, and the coupling member 632 float as one unit, the swing of the housing 1 due to a wave can be suppressed. In addition, since the coupling member 632 is provided above the sea, maintenance of the coupling member 632 itself is facilitated, and since the coupling member 632 can be used as a scaffold, a worker easily comes and goes between the housing 1 and the floating object 631, and maintainability of the power generation system can be improved.

(Regarding Suppressing Extension)

FIG. 44 is a side view of the housing and the like in a floated state. A suppressing extension may be provided for the housing 1 of the power generation device 100 of the embodiment. The "suppressing extension" is used to suppress swing of the system-side accommodation member caused by waves, and extends from the system-side accommodation member along the water surface in the vicinity of the water surface.

For example, a suppressing object 641 in FIG. 44 may be provided for the housing 1. The suppressing object 641 is a suppressing extension, and has, for example, a flat plate shape extending from an outer surface (a front surface, a side surface, or a back surface) of the housing 1 to the sea surface (namely, along the water surface) and has, for example, a flat plate shape. The width (width in a direction from a front side toward a back side of the drawing sheet of FIG. 44) of the suppressing object 641 may be equal to or slightly narrower than the width of the housing 1 in the left-right direction (Y-axis direction in FIG. 1). From the viewpoint of suppressing swing caused by a wave, it is preferable that the length (X-axis direction) of the suppressing object 641 is configured such that a total length of the housing 1 and the suppressing object 641 is equal to or more than a half (for example, approximately 30 m) of the wavelength (for example, approximately 60 m) of the wave.

In addition, the shape of the suppressing object 641 is not limited to a flat plate shape, and the suppressing object 641 may be configured by arranging a plurality of rod-shaped objects in the direction from the front side toward the back side of the drawing sheet of FIG. 44. In addition, the suppressing object 641 may be made of a material having a comparatively large buoyancy with respect to its own weight when the suppressing object 641 sinks in the sea.

In the case of such a configuration, when at least a part of the suppressing object 641 sinks due to a high wave, the suppressing object 641 and the housing 1 float as one unit, so that the swing of the housing 1 due to the wave can be suppressed.

(Regarding Shape)

In addition, the shape of each element may be optionally changed as long as the function of each element can be exhibited. For example, the outer shape of the storage tank-side accommodation portion 2 and the float 27 in FIG. 7 may be a circular shape or a polygonal shape in a plan view.

(Regarding Other Features)

In addition, an entry prevention member that prevents entry of an object such as fish or dust may be provided for the front side opening portion 16 of the housing 1. For example, a net or the like may be used as the entry prevention member.

In addition, a lid may be provided for each storage tank in FIG. 7 to prevent the circulation fluid F from spilling. In addition, as illustrated, a lower end portion (−Z direction) of the third pipe 253 in FIG. 7 may be provided in the circulation fluid F in the lower storage tank 22, or may be provided on the upper side (+Z direction) with respect to the water surface of the circulation fluid F.

(Regarding Interpretation of Terms)

In addition, the power generation device 100, the other power generation device, or a configuration having features related to the power generation device 100 or the other power generation device may be interpreted as a "power generation system".

(Application Example)

For example, the place where the power generation system is used is optional as long as waves occur at the place, and for example, the power generation system may be used in the sea or a lake where waves naturally occur, an artificial pond where artificial waves occur, a pool, or the like.

(Other Features)

In addition, for example, a plurality of sets of the third pipes 253 and the power generation units 23 may be provided between the upper storage tank 21 and the lower storage tank 22 in FIG. 7.

In addition, for example, the number of the second pipes 252 in FIG. 7 is optional, and for example, only one second pipe 252 or three or more second pipes 252 may be provided for the feeding device 24.

In addition, after the size of the upper storage tank 21 and the lower storage tank 22 in FIG. 7 is increased, the storage tank-side accommodation portion 2 may be omitted, and the upper storage tank 21 and the lower storage tank 22 may be directly fixed to the housing 1. It should be noted that in this case, a plurality of combinations in each of which one or more (for example, two or the like) feeding devices 24 are provided for one float 27 (hereinafter, referred to as "sets of the floats and the feeding devices") may be provided inside the housing 1. For example, a specific method for providing the "sets of the floats and the feeding devices" is optional, and for example, a plurality of sets of the floats and the feeding devices may be arranged from the front side (+X direction) toward the back side (−X direction), a plurality of sets of the floats and the feeding devices may be arranged along the side direction (Y-axis direction), or a combination thereof may be arranged. Namely, for example, by arranging four sets from the front side (+X direction) toward the back side (−X direction) and arranging two sets along the side direction (Y-axis direction), eight (=4 (sets)×2 (sets)) "sets of the floats and the feeding devices" may be provided in one housing 1. It should be noted that the shape and size of the housing 1 referred to here may be optionally determined according to the number of the "sets of the floats and the feeding devices".

(Regarding Combination and Omission of Features)

In addition, each feature described in the embodiment or each feature described in the modification examples may be optionally selected and combined, or may be omitted. For example, the outer flow paths 14 may be omitted from the housing 1 in FIG. 1. In addition, the internal front side inclined portion 17 or the internal side inclined portions 18 in FIGS. 5 and 8 may be omitted. In addition, for example, the storage tank-side accommodation portion 2 in FIG. 7 may be omitted, and the upper storage tank 21 and the like may be directly provided inside the housing 1. In addition, for example, the configuration may be such that the lower storage tank 22 in FIG. 7 is omitted and the circulation fluid F in the upper storage tank 21 is directly supplied to the feeding device 24.

(Regarding Variation of Shape of Float)

FIG. 45 is a view illustrating various shapes of floats. It should be noted that in FIGS. 45(a) to 45(f), variations of the shape of the float are illustrated, and specifically, the shapes of the floats when viewed from the side are illustrated. Namely, when a float in FIG. 45 is installed inside the housing of the power generation device, a front side opening portion is provided in one of a left direction and a right direction of the drawing of FIG. 45. The float 27 and the like in FIG. 6 may be configured as a float having a shape illustrated in FIG. 45.

(Regarding Installation of Plurality of Floats)

FIG. 46 is a cross-sectional view illustrating a part of the inside of a power generation device. Instead of the housing 1 of the power generation device 100 of the embodiment, a housing 1B having a comparatively large size in FIG. 46 may be used, and a plurality of floats may be provided for the housing 1B. In FIG. 46, it is assumed that a front side opening portion (not illustrated) of the housing 1B is provided on the right side of the drawing (namely, it is assumed that the right side of the drawing of FIG. 46 is the front side). In addition, although not illustrated in FIG. 46, it is assumed that an internal front side inclined porti on having the same configuration as the internal front side inclined portion 17 in FIG. 6 is provided in the housing 1B. The shape of each float may be determined based on the result of performing an experiment or a simulation for confirming that the float is appropriately moved up and down for the generation of electricity by receiving a wave force, and for example, floats 701 to 705 in FIG. 46 may be arranged from the front side toward the back side.

It should be noted that although the configurations of the feeding device and the like are not illustrated in FIG. 46, in practice, for example, elements (elements other than the float 27 in FIG. 7, such as the feeding device 24) necessary for the generation of electricity illustrated in FIG. 7 are assumed to also be provided.

(Regarding Advantageous Effects of Housing being Partially Inclined)

FIG. 47 is a front view of a housing. A housing 1C in FIG. 47 may be adopted instead of the housing 1 of the power generation device 100 of the embodiment. The housing 1C includes a first portion 11C and a second portion 12C. The first portion 11C is, for example, a portion of which the cross-sectional area in the horizontal direction decreases as the portion moves toward the upper side (+Z direction) due to side surfaces being inclined. The second portion 12C is a portion provided on an upper portion of the first portion 11C, and is, for example, a portion having the same cross-sectional area at each height position.

In the housing 1C, when the sea surface rises from the position of a line 711 to the position of a line 712 in FIG. 47 due to a high wave, the amount of an increase in buoyancy becomes comparatively small, and the increase speed of buoyancy becomes comparatively slow, so that the swing of the housing 1C due to the buoyancy can be suppressed. Namely, for example, compared to a case where the first portion 11C of the housing 1C is not inclined and has the same cross-sectional areas at each height position as in the second portion 12C, the first portion 11C of the housing 1C in FIG. 47 can reduce the volume of a portion located in the sea in response to the rise of the sea surface, so that the amount of an increase in buoyancy becomes comparatively small, and the increase speed of buoyancy becomes comparatively slow. As a result, the swing of the housing 1C due to the buoyancy can be suppressed.

It should be noted that the effects of the invention described here can also be achieved in a housing having the same features as the first portion 11C in FIG. 47 among the housings described in the embodiment or the modification examples.

One embodiment of the present invention provides a power generation system for generating electricity using a potential energy of a fluid raised to a predetermined height position by a wave force, the system comprising: a system-side accommodation member that floats, the system-side accommodation member including an intake opening portion for taking a wave into an inside of the system-side accommodation member on a front side of the system-side accommodation member; a floating body accommodated in the system-side accommodation member; a feeding device that feeds the fluid toward the predetermined height position based on a wave force received by the floating body due to the wave taken into the inside of the system-side accommodation member through the intake opening portion; and a power generation unit that generates the electricity using the potential energy of the fluid raised to the predetermined height position.

According to this embodiment, by feeding the fluid toward the predetermined height position based on the wave force received by the floating body and by generating electricity using the potential energy of the fluid raised to the predetermined height position, for example, electricity can be generated at low cost.

Another embodiment of the present invention provides the power generation system according to the above embodiment, further comprising: a suppressing member that suppresses a swing of the system-side accommodation member caused by a wave of a predetermined wave height or more by causing at least a part of the system-side accommodation member to submerge in water when the suppressing member receives the wave.

According to this embodiment, by providing the suppressing member, for example, the swing of the system-side accommodation member due to a high wave can be suppressed, thereby appropriately generating electricity.

Another embodiment of the present invention provides the power generation system according to the above embodiment, wherein the suppressing member includes a first outer inclined portion provided on the front side of the system-side accommodation member, and the first outer inclined portion is inclined such that a wave of a predetermined wave height or more rises up the first outer inclined portion when the first outer inclined portion receives the wave.

According to this embodiment, by including the first outer inclined portion, for example, the swing of the system-side accommodation member due to a high wave can be suppressed, thereby appropriately generating electricity.

Another embodiment of the present invention provides the power generation system according to the above embodiment, wherein the suppressing member includes an outer flow path provided on a side surface side of the system-side accommodation member, and the outer flow path extends between the front side and a back side of the system-side accommodation member, and is configured such that a wave of a predetermined wave height or more rises up the outer flow path when the outer flow path receives the wave.

According to this embodiment, by including the outer flow path, for example, the swing of the system-side accommodation member due to a high wave can be suppressed, thereby appropriately generating electricity.

Another embodiment of the present invention provides the power generation system according to the above embodiment, wherein the suppressing member includes a second outer inclined portion provided on the front side of the system-side accommodation member, and the second outer inclined portion is continuous with the outer flow path, and is configured to guide a wave of a predetermined wave height or more to the outer flow path when the second outer inclined portion receives the wave.

According to this embodiment, when the second outer inclined portion receives a high wave, the wave can be guided onto the outer flow paths, for example, by guiding the wave to the outer flow paths, so that at least a part of the system-side accommodation member can be reliably submerged in the water, and the swing of the system-side accommodation member due to the high wave can be suppressed, thereby appropriately generating electricity.

Another embodiment of the present invention provides the power generation system according to the above embodiment, wherein the system-side accommodation member has a vibration control structure that absorbs a swing of the system-side accommodation member caused by a wave.

According to this embodiment, since the system-side accommodation member has a vibration control structure, for example, the swing of the system-side accommodation member due to the high wave can be suppressed, thereby appropriately generating electricity.

Another embodiment of the present invention provides the power generation system according to the above embodiment, further comprising: a suppressing floating body that suppresses a swing of the system-side accommodation member caused by a wave, wherein the suppressing floating body floats at a position away from the system-side accommodation member, and the system-side accommodation member and the suppressing floating body are coupled to each other above or under water.

According to this embodiment, since the total length of the power generation system can be made comparatively long, for example, by coupling the system-side accommodation member and the suppressing floating body to each other above or under the water, the swing of the system-side accommodation member due to a high wave can be suppressed, and electricity can be appropriately generated.

Another embodiment of the present invention provides the power generation system according to the above embodiment, further comprising: a suppressing extension that suppresses a swing of the system-side accommodation member caused by a wave, wherein the suppressing extension extends from the system-side accommodation member along a water surface in the vicinity of the water surface.

According to this embodiment, since the total length of the power generation system can be made comparatively long, for example, by providing the suppressing extension, the swing of the system-side accommodation member due to a high wave can be suppressed, and electricity can be appropriately generated.

Another embodiment of the present invention provides the power generation system according to the above embodiment, further comprising: an upper storage member provided at the predetermined height position, the upper storage member being configured to store the fluid fed by the feeding device; and a storage member-side accommodation member that accommodates the upper storage member, wherein the storage member-side accommodation member is suspended from the system-side accommodation member inside the system-side accommodation member.

According to this embodiment, since the magnitude of swing of the system-side accommodation member due to a high wave can be prevented from being directly transmitted to the storage member-side accommodation member, for example, by suspending the storage member-side accommodation member from the system-side accommodation member inside the system-side accommodation member, the magnitude of the swing of the storage member-side accommodation member can be reduced.

Another embodiment of the present invention provides the power generation system according to the above embodiment, further comprising: a guide member that guides the system-side accommodation member to the front side of the system-side accommodation member when the system-side accommodation member floats up after submerging.

According to this embodiment, when the system-side accommodation member floats up after submerging, the system-side accommodation member is guided to the front side of the system-side accommodation member. Therefore, for example, even when the power generation system receives a high wave from the front side, the power generation system can be prevented from being swept away by the high wave.

Another embodiment of the present invention provides the power generation system according to the above embodiment, further comprising: a first inner inclined portion extending from the intake opening portion toward a floating body side inside the system-side accommodation member, the first inner inclined portion being inclined to be located upward as the first inner inclined portion extends away from the intake opening portion.

According to this embodiment, since the first inner inclined portion is provided, for example, the water depth inside the system-side accommodation member becomes shallower as the distance from the intake opening portion increases, so that the wave height inside the system-side accommodation member can be increased, and the wave force can be increased, thereby appropriately generating electricity.

Another embodiment of the present invention provides the power generation system according to the above embodiment, further comprising: second inner inclined portions provided on both sides of the first inner inclined portion inside the system-side accommodation member, the second inner inclined portions being inclined more steeply than the first inner inclined portion.

According to this embodiment, since the amount of reflection of a wave inside the system-side accommodation member can be suppressed, for example, by providing the second inner inclined portions, the usage efficiency of the wave can be improved, and the electricity generation efficiency can be improved.

Another embodiment of the present invention provides the power generation system according to the above embodiment, further comprising: a drainage adjustment member that adjusts a drainage time related to the wave taken into the inside of the system-side accommodation member, the drainage adjustment member being provided inside the system-side accommodation member.

According to this embodiment, since water (for example, seawater) can be retained inside the system-side accommodation member for a time sufficient for sufficiently feeding the fluid toward the predetermined height position, for example, by providing the drainage adjustment member, the fluid can be appropriately raised to the predetermined height position, and electricity can be appropriately generated.

Another embodiment of the present invention provides the power generation system according to the above embodiment, further comprising: an intake plate provided in the intake opening portion, the intake plate being configured to take a wave into the inside of the system-side accommodation member upon being hit by the wave.

According to this embodiment, since waves can be sufficiently taken into the inside of the system-side accommodation member, for example, by providing the intake plate that takes waves into the inside of the system-side accommodation member upon being hit by the waves, electricity can be appropriately generated.

Another embodiment of the present invention provides the power generation system according to the above embodiment, further comprising: a retention member that retains the system-side accommodation member at a predetermined position.

According to this embodiment, by providing retention member that retains the system-side accommodation member at a predetermined position, for example, the power generation system can be prevented from being swept away by the high wave.

Another embodiment of the present invention provides the power generation system according to the above embodiment, wherein the fluid is a fluid formed of mixed water containing a chain polymer, and the power generation system floats in the sea.

According to this embodiment, since the fluid is a fluid formed of mixed water containing a chain polymer, for example, the fluid can be efficiently raised to the predetermined height position, so that the electricity generation efficiency can be improved.

REFERENCE SIGNS LIST

1: housing
1A: housing
1B: housing
1C: housing
2: storage tank-side accommodation portion
4: storage tank-side accommodation portion
10: hollow portion
11: housing-side front portion
11C: first portion
12: housing-side side portion
12C: second portion
13: housing-side back portion
14: outer flow path
15: front side inclined portion
16: front side opening portion
17: internal front side inclined portion
18: internal side inclined portion
18A: inner wall portion
19: internal bottom portion
20: suspension portion
21: upper storage tank
22: lower storage tank
23: power generation unit
24: feeding device
24A: feeding device
27: float
31: drainage adjustment portion
32: installation base
33: buffer material
41: upper storage tank
42: lower storage tank
43: power generation unit
44: main feeding device
45: auxiliary feeding device
47: check valve
48: float
100: power generation device
141: flow path side wall portion
142: flow path bottom portion
241: bellows tube
242: duct tube
251: first pipe
251A: upper end portion
251B: guide plate
251C: open portion
252: second pipe
253: third pipe
261: first pipe-side check valve
262: second pipe-side check valve
27A: hollow portion
271: first portion
272: second portion
241A: bellows tube
242A: duct tube
441: bellows tube
442: duct tube
451: bellows tube
452: connection member
452A: upper portion
460: communication portion
461A: main first pipe
462A: main second pipe
461B: auxiliary first pipe
462B: auxiliary second pipe
463: third pipe
511: housing
512: front side opening portion
513: seawater storage portion
514: drainage opening portion
515: internal front side inclined portion
521: first maintaining portion
521A: float
521B: plug
521C: weight
522: second maintaining portion
531: float
532: fin
533: fin
541: housing
542: front side opening portion
543: intake plate
544: end portion
551: housing
552: protruding portion
561: housing
562: protruding portion
563: connection portion
571: housing
572: housing
573: housing
574: housing
574A: protruding portion
575: housing
574A: protruding portion
576: housing
576A: wall portion
577: housing 577A: first portion
577B: second portion
577C: pillar member
577Z: cavity
611: retention portion
612: retention portion
613: retention portion
621: retention portion
622: floating object
623: coupling member
624: wire-shaped body
621A: connection portion
631: floating object
632: coupling member
641: suppressing object
701: float
702: float
703: float
704: float
705: float
711: line
712: line
2711: float
2711A: front portion
A11: arrow
A12: arrow
A13: arrow
D1: distance
F: circulation fluid

The invention claimed is:

1. A power generation system for generating electricity using a potential energy of a fluid raised to a predetermined height position by a wave force, the system comprising:
a system-side accommodation member that floats, the system-side accommodation member including an intake opening portion for taking a wave into an inside of the system-side accommodation member on a front side of the system-side accommodation member;
a floating body accommodated in the system-side accommodation member;
a feeding device that feeds the fluid toward the predetermined height position based on a wave force received by the floating body due to the wave taken into the inside of the system-side accommodation member through the intake opening portion;
a power generation unit that generates the electricity using the potential energy of the fluid raised to the predetermined height position; and
a suppressing member that suppresses a swing of the system-side accommodation member caused by a wave of a predetermined wave height or more by causing at least a part of the system-side accommodation member to submerge in water when the suppressing member receives the wave,
wherein the suppressing member includes an outer flow path provided on a side surface side of the system-side accommodation member, and
wherein the outer flow path extends between the front side and a back side of the system-side accommodation member, and is configured such that a wave of a predetermined wave height or more rises up the outer flow path when the outer flow path receives the wave.

2. The power generation system according to claim 1, wherein
the suppressing member includes a first outer inclined portion provided on the front side of the system-side accommodation member, and
the first outer inclined portion is inclined such that a wave of a predetermined wave height or more rises up the first outer inclined portion when the first outer inclined portion receives the wave.

3. The power generation system according to claim 1, wherein
the suppressing member includes a second outer inclined portion provided on the front side of the system-side accommodation member, and
the second outer inclined portion is continuous with the outer flow path, and is configured to guide a wave of a predetermined wave height or more to the outer flow path when the second outer inclined portion receives the wave.

4. The power generation system according to claim 1, wherein the system-side accommodation member has a vibration control structure that absorbs a swing of the system-side accommodation member caused by a wave.

5. The power generation system according to claim 1, further comprising:
a suppressing floating body that suppresses a swing of the system-side accommodation member caused by a wave, wherein
the suppressing floating body floats at a position away from the system-side accommodation member, and
the system-side accommodation member and the suppressing floating body are coupled to each other above or under water.

6. The power generation system according to claim 1, further comprising:
a suppressing extension that suppresses a swing of the system-side accommodation member caused by a wave, wherein the suppressing extension extends from the system-side accommodation member along a water surface in the vicinity of the water surface.

7. The power generation system according to claim 1, further comprising:
an upper storage member provided at the predetermined height position, the upper storage member being configured to store the fluid fed by the feeding device; and
a storage member-side accommodation member that accommodates the upper storage member, wherein
the storage member-side accommodation member is suspended from the system-side accommodation member inside the system-side accommodation member.

8. The power generation system according to claim 1, further comprising:
a guide member that guides the system-side accommodation member to the front side of the system-side accommodation member when the system-side accommodation member floats up after submerging.

9. The power generation system according to claim 1, further comprising:
a first inner inclined portion extending from the intake opening portion toward a floating body side inside the system-side accommodation member, the first inner inclined portion being inclined to be located upward as the first inner inclined portion extends away from the intake opening portion.

10. The power generation system according to claim 9, further comprising:
second inner inclined portions provided on both sides of the first inner inclined portion inside the system-side accommodation member, the second inner inclined portions being inclined more steeply than the first inner inclined portion.

11. The power generation system according to claim 1, further comprising:
a drainage adjustment member that adjusts a drainage time related to the wave taken into the inside of the system-side accommodation member, the drainage adjustment member being provided inside the system-side accommodation member.

12. The power generation system according to claim 1, further comprising:
an intake plate provided in the intake opening portion, the intake plate being configured to take a wave into the inside of the system-side accommodation member upon being hit by the wave.

13. The power generation system according to claim 1, further comprising:
a retention member that retains the system-side accommodation member at a predetermined position.

14. The power generation system according to claim 1, wherein
the fluid is a fluid formed of mixed water containing a chain polymer, and
the power generation system floats in the sea.

15. A power generation system for generating electricity using a potential energy of a fluid raised to a predetermined height position by a wave force, the system comprising:
a system-side accommodation member that floats, the system-side accommodation member including an intake opening portion for taking a wave into an inside of the system-side accommodation member on a front side of the system-side accommodation member;
a floating body accommodated in the system-side accommodation member;
a feeding device that feeds the fluid toward the predetermined height position based on a wave force received by the floating body due to the wave taken into the inside of the system-side accommodation member through the intake opening portion; and
a power generation unit that generates the electricity using the potential energy of the fluid raised to the predetermined height position,
wherein the system-side accommodation member has a vibration control structure that absorbs a swing of the system-side accommodation member caused by a wave,
wherein the system-side accommodation member is configured such that a plurality of portions divided in the height direction are stacked on each other,
wherein each of the plurality of portions is configured to swing independently of each other in the horizontal direction.

* * * * *